(12) United States Patent
Moriyama

(10) Patent No.: US 9,956,983 B2
(45) Date of Patent: May 1, 2018

(54) STEERING WHEEL POSITION ADJUSTMENT DEVICE

(71) Applicant: NSK LTD., Tokyo (JP)

(72) Inventor: Seiichi Moriyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/027,876

(22) PCT Filed: Nov. 26, 2014

(86) PCT No.: PCT/JP2014/081295
§ 371 (c)(1),
(2) Date: Apr. 7, 2016

(87) PCT Pub. No.: WO2015/104913
PCT Pub. Date: Jul. 16, 2015

(65) Prior Publication Data
US 2016/0244086 A1 Aug. 25, 2016

(30) Foreign Application Priority Data

Jan. 7, 2014 (JP) .................................. 2014-000955
Aug. 22, 2014 (JP) .................................. 2014-168952

(51) Int. Cl.
*B62D 1/184* (2006.01)
*B62D 1/187* (2006.01)
(Continued)

(52) U.S. Cl.
CPC .............. *B62D 1/184* (2013.01); *B62D 1/187* (2013.01); *B62D 1/185* (2013.01); *B62D 1/195* (2013.01)

(58) Field of Classification Search
CPC ........ B62D 1/184; B62D 1/185; B62D 1/187; B62D 1/195
See application file for complete search history.

(56) References Cited

U.S. PATENT DOCUMENTS 6,070,686 A * 6/2000 Pollmann ............ B60R 25/0221
180/287
6,095,012 A 8/2000 Lutz
(Continued)

FOREIGN PATENT DOCUMENTS

JP 10-35511 A 2/1998
JP 2004-210264 A 7/2004
(Continued)

OTHER PUBLICATIONS

Machine translation of WO 2012173143 A1.*
(Continued)

*Primary Examiner* — Barry Gooden, Jr.
(74) *Attorney, Agent, or Firm* — Sughrue Mion, PLLC

(57) ABSTRACT

A steering wheel position adjustment device includes a displacement bracket fixed to a steering column, a pair of support plate parts for interposing the displacement bracket, an adjustment rod inserted in a through hole in the displacement bracket and in through holes in the support plate parts, a pair of pressing parts provided at both ends of the adjustment rod, an adjustment lever provided to one end of the adjustment rod and configured to expand and contract an interval between the pressing parts, and a rotating friction plate. The rotating friction plate is interposed between the displacement bracket and the support plate parts and/or between the support plate parts and the pressing parts. The rotating friction plate has a base end portion rotatably supported by a rotation support shaft, and a tip half portion formed with a long guide hole with which the adjustment rod is engaged.

12 Claims, 29 Drawing Sheets

(51) Int. Cl.
*B62D 1/185* (2006.01)
*B62D 1/19* (2006.01)

(56) References Cited

U.S. PATENT DOCUMENTS

| | | | | |
|---|---|---|---|---|
| 6,131,481 | A * | 10/2000 | Wilson | B62D 1/184 74/492 |
| 9,039,042 | B2 * | 5/2015 | Moriyama | B62D 1/187 280/775 |
| 9,205,857 | B2 * | 12/2015 | Moriyama | B62D 1/184 |
| 9,333,983 | B2 * | 5/2016 | Lathrop | B62D 1/04 |
| 2004/0134301 | A1 * | 7/2004 | Ko | B62D 1/184 74/492 |
| 2004/0155448 | A1 | 8/2004 | Klukowski et al. | |
| 2005/0242562 | A1 * | 11/2005 | Ridgway | B62D 1/195 280/777 |
| 2012/0146316 | A1 | 6/2012 | Roach | |
| 2013/0133463 | A1 * | 5/2013 | Moriyama | B62D 1/184 74/493 |
| 2013/0205933 | A1 * | 8/2013 | Moriyama | B62D 1/187 74/493 |
| 2016/0375925 | A1 * | 12/2016 | Lubischer | G05D 1/0061 701/41 |
| 2016/0375926 | A1 * | 12/2016 | Lubischer | B62D 1/183 74/493 |

FOREIGN PATENT DOCUMENTS

| | | |
|---|---|---|
| JP | 2013-63724 A | 4/2013 |
| JP | 2013-79051 A | 5/2013 |
| JP | 2013-193536 A | 9/2013 |
| WO | WO-2012173143 A1 * 12/2012 | ............. B62D 1/187 |

OTHER PUBLICATIONS

Communication dated Nov. 7, 2016, issued by the European Patent Office in counterpart European application No. 14877730.3.
Search Report dated Mar. 3, 2015 by the International Searching Authority in related Application No. PCT/JP2014/081295, (PCT/ISA/210 & PCT/ISA/220).
Written Opinion dated Mar. 3, 2015 by the International Searching Authority in related Application No. PCT/JP2014/081295, (PCT/ISA/237).

* cited by examiner

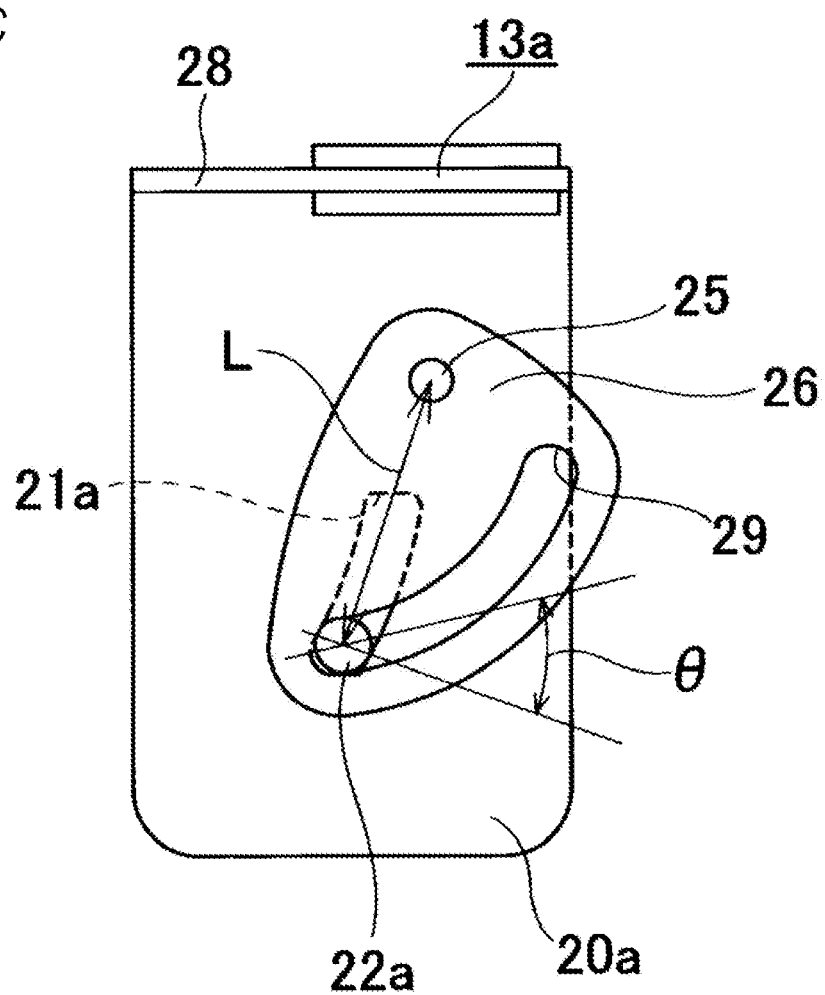

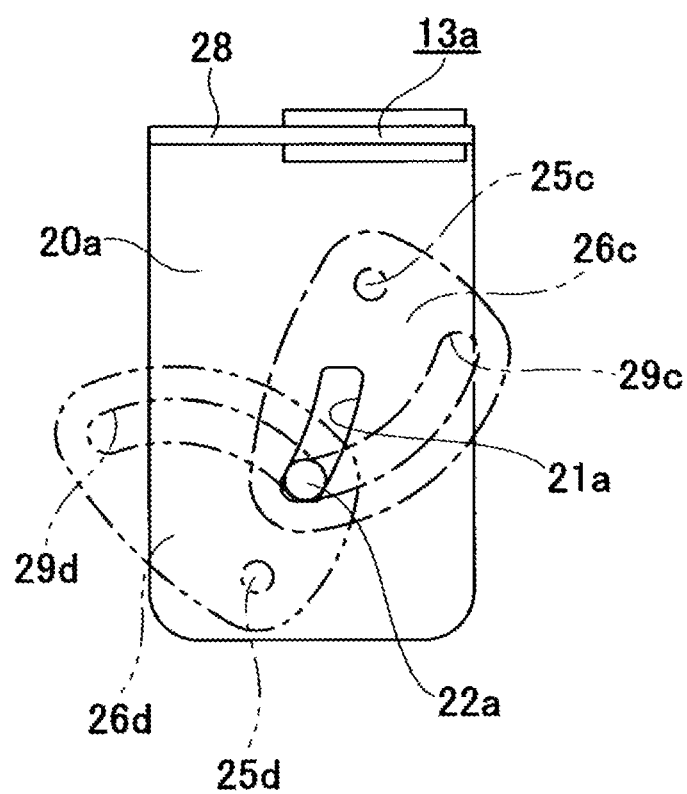

STEERING WHEEL POSITION ADJUSTMENT DEVICE

TECHNICAL FIELD

The present invention relates to a steering wheel position adjustment device which is configured to adjust an upper-lower position of a steering wheel in accordance with a physique and a driving posture of a driver.

BACKGROUND ART

A related-art automobile steering device is configured as shown in FIG. 19. When rotation of a steering wheel 1 is transmitted to an input shaft 3 of a steering gear unit 2, the input shaft 3 is rotated, so that right and left tie rods 4, 4 are pushed and pulled to apply a steering angle to front wheels. The steering wheel 1 is supported and fixed to a rear end portion of a steering shaft 5. The steering shaft 5 is rotatably supported to a cylindrical steering column 6 in a state of being axially inserted into the steering column 6. A front end portion of the steering shaft 5 is connected to a rear end portion of an intermediate shaft 8 via a universal joint 7. A front end portion of the intermediate shaft 8 is connected to the input shaft 3 via another universal joint 9. In the specification, a front-rear direction, a left-right direction (width direction) and an upper-lower direction indicate a front-rear direction, a left-right direction (width direction) and an upper-lower direction of a vehicle, unless particularly otherwise mentioned.

In the steering device configured as described above, there has been known a tilt mechanism for adjusting an upper-lower position of the steering wheel 1 and a telescopic mechanism for adjusting a front-rear position of the steering wheel 1 in accordance with a physique and a driving posture of a driver. In order to configure the tilt mechanism, a front end portion of the steering column 6 is supported to a vehicle body 10 so as to be pivotably displaceable about a pivot shaft 11 mounted in the left-right direction. A displacement bracket 12 is fixed to a rear end side portion of the steering column 6 and is supported to a support bracket 13 supported to the vehicle body 10 so as to be displaceable in the upper-lower direction and the front-rear direction. In order to configure the telescopic mechanism, the steering column 6 has a structure where an outer column 14 and an inner column 15 are telescopically combined. The steering shaft 5 has a structure where an outer shaft 16 and an inner shaft 17 are combined to transmit torque and to be telescopic by a spline engagement and the like. In the example of FIG. 19, there is incorporated an electric power steering device configured to reduce a force necessary to operate the steering wheel 1 by using an electric motor 18 as an auxiliary power source.

In case of a manual type except an electric type, the tilt mechanism and the telescopic mechanism are configured to adjust a position of the steering wheel 1 and to fix the steering wheel 1 to an adjusted position based on an operation of an adjustment lever. As the structure of the tilt mechanism or telescopic mechanism of the manual type, various structures have been known and implemented. For example, in case of the structure shown in FIG. 19, the displacement bracket 12 fixed to the outer column 14 is formed with a front-rear long hole 19 which is long in an axial direction of the outer column 14, which is a front-rear position adjustment direction. The support bracket 13 has a pair of support plate parts 20 configured to interpose therebetween the displacement bracket 12 from left and right sides. Upper-lower long holes 21, which are long in the upper-lower direction, are formed at portions of the support plate parts 20 facing each other. The upper-lower long hole 21 has generally a partial arc shape having the pivot shaft 11 as a center. An adjustment rod 22 is inserted into the upper-lower long holes 21 and the front-rear long hole 19. The adjustment rod 22 is provided with a pair of pressing parts configured to interpose therebetween the support plate parts 20 from left and right sides. An expansion and contraction device is configured to expand and contract an interval between the pressing parts based on an operation of the adjustment lever.

When adjusting an upper-lower position or front-rear position of the steering wheel 1, the adjustment lever is rotated in a predetermined direction (a downward direction, generally), thereby expanding the interval between the pressing parts. Accordingly, the frictional force acting between an inner surface of the support plate parts 20 and an outer surface of the displacement bracket 12 is reduced. At this state, the adjustment rod 22 adjusts a position of the steering wheel 1 within a range displaceable in the upper-lower long holes 21 and the front-rear long hole 19. After the adjustment, the adjustment lever is rotated in a reverse direction (an upward direction, generally) to the predetermined direction, thereby contracting the interval between the pressing parts. Accordingly, the frictional force is increased to hold the steering wheel 1 at an adjusted position.

The steering device has a structure which permits the steering wheel 1 to be displaced forwards so as to alleviate the shock load to be applied to the driver when a secondary collision that a driver's body collides with the steering wheel 1 occurs upon collision accident. Specifically, the support bracket 13 is supported to the vehicle body 10 to be separated forwards by the shock caused upon the secondary collision. In the steering device having this structure, when the force of holding the steering wheel 1 at the adjusted position, i.e., the holding force of the outer column 14 to the support bracket 13 is weak, the outer column 14 may be unintentionally moved relative to the support bracket 13 upon the secondary collision. If the outer column 14 is moved, since the manner of the shock to be applied to the support bracket 13 varies, it may be difficult to design a shock absorption mechanism based on the configuration where the support bracket 13 is to be separated from the vehicle body 10.

In the meantime, in order to increase the holding force of the outer column 14 to the support bracket 13 without increasing an adjusting amount or adjusting force of the adjustment lever, it is preferably to increase the number of friction surfaces for securing the holding force. In view of this situation, Patent Document 1 discloses a structure of increasing the number of friction surfaces by overlapping a friction plate supported to the steering column and a friction plate supported to the support bracket in the left-right direction. However, according to the structure disclosed in Patent Document 1, each friction plate is supported to the steering column or the support bracket to be displaceable only in the left-right direction. For this reason, the number of the friction plates necessary to increase the number of the friction surfaces increases. Therefore, as the number of friction surfaces increases, the size in the left-right direction, the number of components and the weight are respectively increased.

BACKGROUND ART DOCUMENT

Patent Document

Patent Document 1: JP-A-H10-35511

SUMMARY OF THE INVENTION

Problem to be Solved

It is an object of the present invention to provide a steering wheel position adjustment device capable of increasing a force of holding a steering wheel at an adjusted position by fewer friction plates and smoothly adjusting a position of the steering wheel.

Means for Solving the Problem

According to an aspect of the present invention, there is provided a steering wheel position adjustment device. The steering wheel position adjustment device includes a cylindrical steering column, a displacement bracket fixed to a portion of the steering column, a support bracket supported to a vehicle body, an adjustment rod, a pair of pressing parts, an adjustment lever and a friction plate. A steering shaft having a friction plate configured to support a steering wheel is rotatably supported to an inner side of the steering column. The displacement bracket is formed with a column-side through hole penetrating the displacement bracket in a width direction. The support bracket has a pair of support plate parts interposing therebetween the displacement bracket from both sides in the width direction. Vehicle body-side through holes are formed at portions where the support plate parts conform to each other. The adjustment rod is inserted in the column-side through hole and the vehicle body-side through holes in the width direction. The pair of pressing parts is provided at both end portions of the adjustment rod protruding from outer surfaces of the pair of support plate parts. The adjustment lever is provided at one end portion of the adjustment rod and is configured to rotate about the adjustment rod (including rotation together with the adjustment rod) to expand and contract an interval between the pair of pressing parts. The friction plate is interposed in at least one of a portion between an inner surface of the pair of support plate parts and a side surface of the displacement bracket and a portion between an outer surface of the pair of support plate parts and an inner surface of the pair of pressing parts. At least one of the column-side through hole and the vehicle body-side through holes is configured as an adjustment long hole which is long in a direction in which a position of the steering wheel is adjustable.

The friction plate includes at least one rotating friction plate having a base end portion rotatably supported to a rotation support shaft and a tip half portion formed with a long guide hole with which the adjustment rod is engaged. The rotation support shaft is provided at a portion which is displaced relative to the adjustment rod when the adjustment rod is displaced along the adjustment long hole and which is positioned on an extension line (including a vicinity thereof) of a center line of the adjustment long hole. The adjustment rod is engaged with the long guide hole to be displaceable only along the long guide hole. At least a portion of the at least one rotating friction plate is interposed in the at least one of the portion between the inner surface of the pair of support plate parts and the side surface of the displacement bracket and the portion between the outer surface of the pair of support plate parts and the inner surface of the pair of pressing parts.

The long guide hole may be formed such that a distance from the rotation support shaft becomes greater as proceeding from one end of the long guide hole towards the other end of the long guide hole in a rotating direction about the rotation support shaft.

The at least one the rotating friction plate may include a pair of rotating friction plates. In this case, a rotation support shaft configured to rotatably support a base end portion of one of the rotating friction plates may be provided at one side of the adjustment long hole on the extension line of the center line of the adjustment long hole, and a rotation support shaft configured to rotatably support a base end portion of the other of the rotating friction plates may be provided at the other side of the adjustment long hole on the extension line of the center line of the adjustment long hole. Alternatively, the rotation support shafts configured to rotatably support base end portions of the rotating friction plates may be concentric, and the rotating friction plates may be rotated in opposite directions when adjusting a position of the steering wheel in one direction.

The at least one rotating friction plate may be configured by a steel plate, a stainless steel plate or an aluminum-based alloy plate. A side surface of the at least one rotating friction plate may be surface-treated so as to increase a frictional coefficient with a surface facing the side surface.

A front end portion of the steering column may be supported to the vehicle body so as to be pivotably displaceable about a pivot shaft extending parallel with the adjustment rod. In this case, each of the vehicle body-side through holes may be configured as an upper-lower long hole which is long in an upper-lower direction, and the rotation support shaft may be provided on a side surface of one of the support plate parts. The steering column may be configured by fitting a front end portion of an outer column to a rear end portion of an inner column to be relatively displaceable in an axial direction. In this case, the displacement bracket may be fixed to the outer column, the column-side through hole may be configured as a front-rear long hole which is long in an axial direction of the outer column, and the rotation support shaft may be provided on an outer surface of the outer column.

Effects of the Invention

In the steering wheel position adjustment device according to an embodiment of the present invention, it is possible to increase the force of holding the steering wheel at an adjusted position even with the few rotating friction plates and to smoothly adjust a position of the steering wheel. That is, at a state where the interval between the pair of pressing parts is contracted so as to hold the steering wheel at an adjusted position, the rotating friction plate is strongly interposed between the side surface of the support plate part and an opposing surface facing the side surface. When moving the position (upper-lower position or front-rear position) of the steering wheel from this state, both side surfaces of the rotating friction plate are in strong friction with the outer surface of the support plate part and the opposing surface. For example, when moving the position (upper-lower position or front-rear position) of the steering wheel from a state where the steering wheel is kept at a desired position, it is necessary to rotate the rotating friction plate while sliding the friction surfaces, which are both side surfaces of the rotating friction plate. For this reason, it is possible to increase the force of holding the steering wheel at the adjusted position. According to the present invention, the structure capable of increasing the force of holding the steering wheel at the adjusted position can be achieved by the few rotating friction plate without overlapping a plurality of friction plates, unlike the structure disclosed in Patent Document 1. Therefore, it is possible to suppress the increases in the width size, the number of components and the weight of the steering wheel position adjustment device, so that it is possible to size-reduce and lighten the steering wheel position adjustment device.

Further, the rotating friction plate is rotatably supported to the rotation support shaft provided at the portion which is displaced relative to the adjustment rod when the adjustment rod is displaced along the adjustment long hole and which is positioned on the extension line of the center line of the adjustment long hole. For this reason, when adjusting the position of the steering wheel, it is possible to reduce a frictional resistance against the displacement of the adjustment rod, which is to be applied to the adjustment rod based on frictional forces applied to engaging portions (contact sliding portions) between an outer peripheral surface of the adjustment rod and inner peripheral edges of the long guide hole and adjustment long hole of the rotating friction plate. As a result, it is possible to smoothly adjust the position of the steering wheel.

BRIEF DESCRIPTION OF THE DRAWINGS

FIG. 3C is a side view illustrating a position of the rotating friction plate at a state where the steering wheel is moved to a lower end position.

FIG. 7C is a side view illustrating a position of the rotating friction plate at a state where the steering wheel is moved to the lower end position.

DETAILED DESCRIPTION OF EMBODIMENTS

Figure 1:
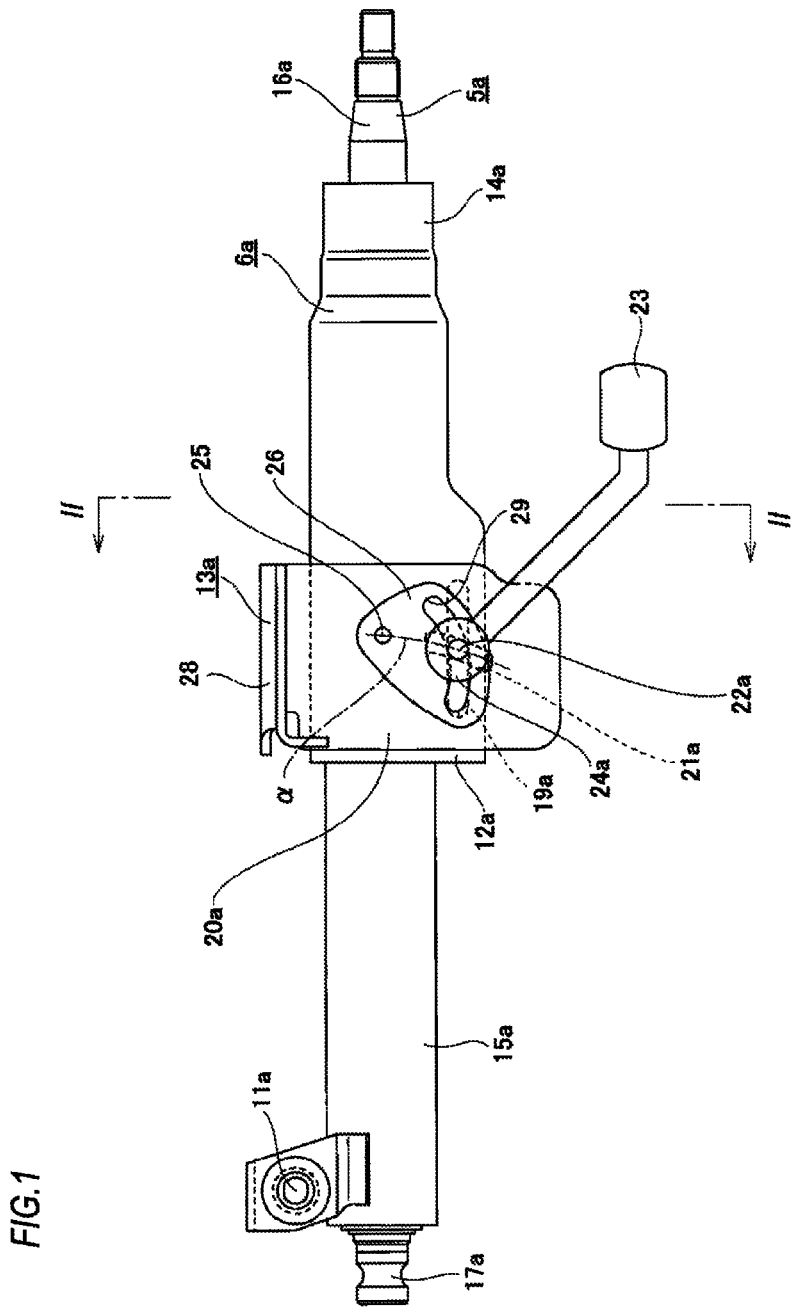
FIG. 1 is a side view illustrating a first embodiment of the present invention.
Figure 2:
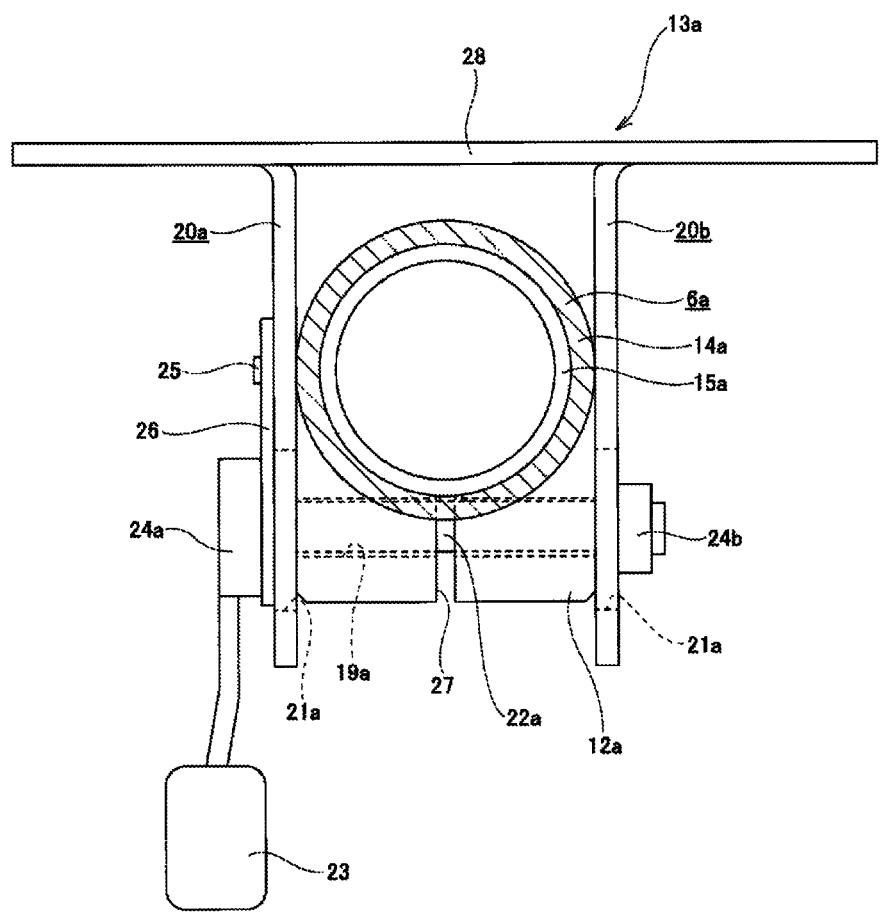
FIG. 2 is a sectional view taken along a line II-II of FIG. 1.

FIGS. 1 to 3C illustrate a first embodiment. A steering wheel position adjustment device of the first embodiment includes a steering column 6a, a displacement bracket 12a, a front-rear long hole 19a which is a column-side through hole, a steering shaft 5a, a support bracket 13a, right and left upper-lower long holes 21a, 21a, an adjustment rod 22a, a pair of pressing parts 24a, 24b, an adjustment lever 23, a rotation support shaft 25, and a rotating friction plate 26. The steering column 6a is a telescopic steering column in which a rear end portion of an inner column 15a arranged at a front side and a front end portion of an outer column 14a arranged at a rear side are fitted to be relatively displaceable in an axial direction, and an entire shape thereof is cylindrical. The displacement bracket 12a is formed integrally with the outer column 14a by die-casting a light alloy such as an aluminum-based alloy and the like. The displacement bracket 12a is configured to elastically expand and contract an entire width thereof by a slit 27 formed at a center in the width direction. The front-rear long hole 19a is a part of the displacement bracket 12a and is formed to penetrate the displacement bracket 12a in the width direction at a position where the front-rear long holes 19a are aligned with each other with the slit 27 being interposed.

Figure 19:
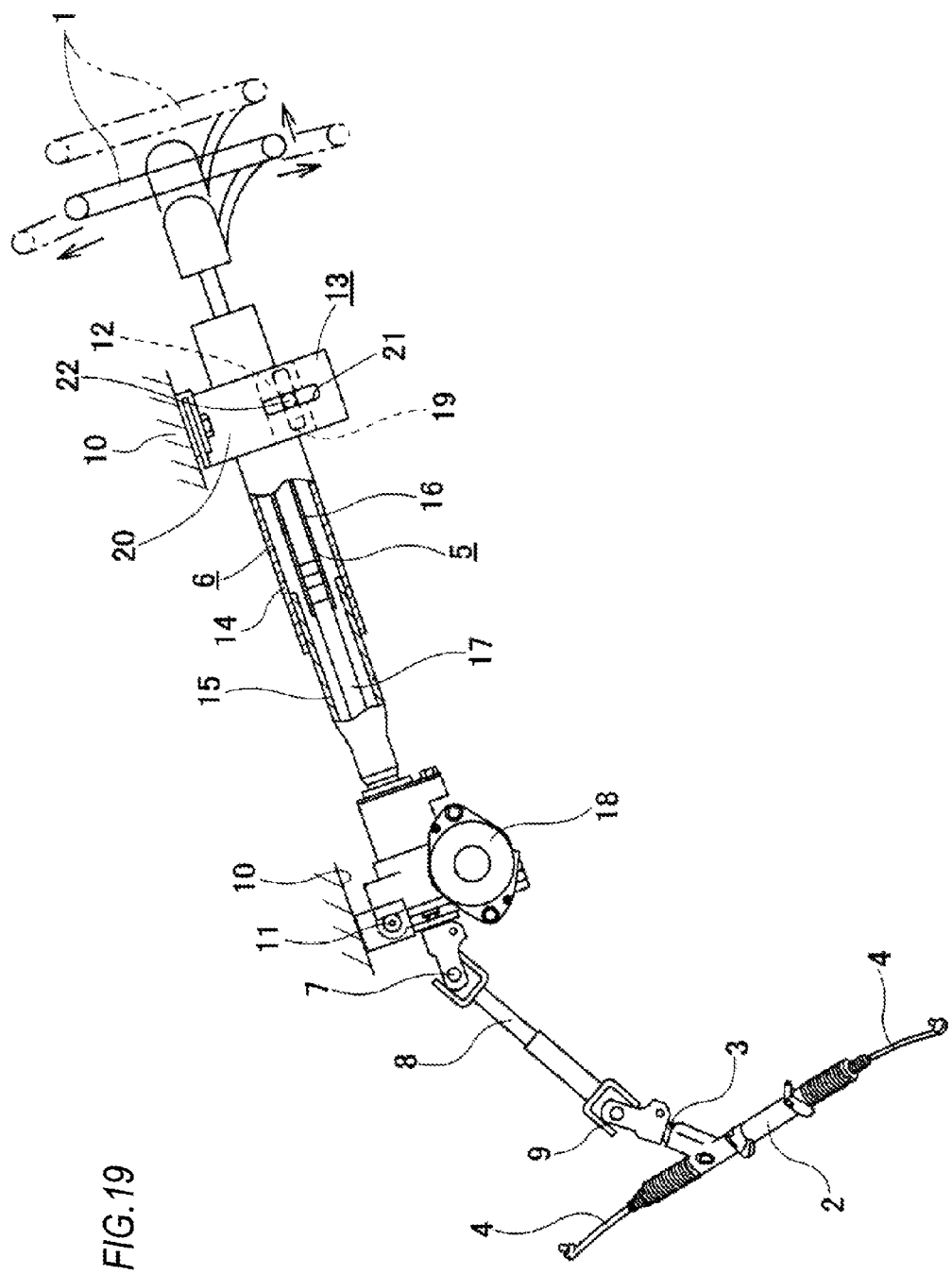
FIG. 19 a schematic partially sectional side view illustrating a related-art example of a steering wheel position adjustment device.

The steering shaft 5a has a configuration where a front end portion of an outer shaft 16a arranged at the rear side and a rear end portion of an inner shaft 17a arranged at the front side are combined to transmit torque or to be telescopic by spline engagement and the like. The steering shaft 5a is rotatably supported such that an intermediate rear side portion of the outer shaft 16a is supported to the rear end portion of the outer column 14a and an intermediate front side portion of the inner shaft 17a is supported to the front end portion of the inner column 15a via a rolling bearing capable of bearing radial load and thrust load, such as a single-row, deep-groove radial ball bearing. Therefore, the steering shaft 5a is configured to expand and contract as the steering column 6a expands and contracts. A steering wheel 1 (refer to FIG. 19) is supported and fixed to a portion protruding rearward from a rear end opening of the outer column 14a at the rear end portion of the outer shaft 16a.

The support bracket 13a is configured by bending a metal plate capable of securing necessary strength and stiffness, such as a steel plate. The support bracket 13a has an attachment plate part 28 for supporting the support bracket to a vehicle body and a pair of support plate parts 20a, 20b hanging from a lower surface of the attachment plate part 28 and parallel with each other. An interval between inner surfaces of the support plate parts 20a, 20b substantially coincides with a sum of a width size of the displacement bracket 12a and a thickness of the rotating friction plate 26. Upper-lower long holes 21a, 21a are formed at portions of the support plate parts 20a, 20b conforming to each other and have a partial arc shape having a pivot shaft 11a, which is configured to support the front end portion of the steering column 6a to be pivotably displaceable, as a center. However, each of the upper-lower long holes 21a, 21a may be formed to have a linear shape which is inclined upwards as proceeding towards the rear. The support bracket 13a having the above configuration is supported to the vehicle body such that it can be separated forwards by shock load applied upon a secondary collision but the sufficient stiffness of the steering column 6a can be secured at normal time.

The adjustment rod 22a is inserted into the front-rear long hole 19a and the upper-lower long holes 21a, 21a in the width direction. The pressing parts 24a, 24b are provided at both end portions of the adjustment rod 22a, which protrude from outer surfaces of the support plate parts 20a, 20b, and an interval between the pressing parts 24a, 24b can be expanded and contracted by the adjustment lever 23. A structure for expanding and contracting the interval between the pressing parts 24a, 24b by the adjustment lever 23 is not particularly limited. For example, a cam device capable of expanding and contracting a size in a width direction by engagement of cam surfaces of a pair of cam members or a structure of screwing a nut to a male screw part provided at a tip portion of the adjustment rod 22a may be adopted. In any structure, the adjustment lever 23 is provided at one end portion of the adjustment rod 22a and is configured to rotate about the adjustment rod 22a, thereby expanding and contracting the interval between the pressing parts 24a, 24b.

The rotation support shaft 25 is provided on an outer surface (a left side surface of FIG. 2) of the support plate part 20a, which is displaced relative to the adjustment rod 22a when adjusting the upper-lower position of the steering wheel 1, in parallel with the adjustment rod 22a. The rotation support shaft 25 is mounted to a portion (including a vicinity inasmuch as an angle θ (which will be described later) is substantially constant irrespective of the upper-lower position of the adjustment rod 22a) of the outer surface of the support plate part 20a, which portion is positioned on an extension line (a partial arc having the pivot shaft 11a as a center) of a center line α (refer to FIG. 1) of the upper-lower long hole 21a formed in the support plate part 20a and above the upper-lower long hole 21a.

The rotating friction plate 26 is a flat plate member having a substantially circular sector shape formed by a metal plate such as a steel plate, a stainless steel plate or an aluminum-based alloy capable of securing necessary strength and stiffness and increasing frictional coefficients of contact portions with the outer surface of the support plate part 20a and an inner surface (a right side surface of FIG. 2) of the pressing part 24a, which are opposing surfaces of the rotating friction plate. The rotating friction plate 26 is interposed between the outer surface of the support plate part 20a and the inner surface of the pressing part 24a. The adjustment rod 22a is inserted into a long guide hole 29 provided in a tip half portion (wide width portion) of the rotating friction plate 26. The long guide hole 29 is formed to be a smooth curve such that a distance from the rotation support shaft 25 becomes greater from a rear end (a rear end in the clockwise direction of FIG. 1), which is one end in the rotating direction to a front end (a front end in the clockwise direction of FIG. 1), which is the other end in the rotating direction. Specifically, the long guide hole 29 has a partial arc shape having, as a center, a point positioned in front of the center line α and above the rotation support shaft 25 at a state (refer to a state shown in FIG. 3B) where the adjustment rod 22a is positioned at a center in the upper-lower long hole 21a. An angle θ between a tangential line of a portion of the partial arc to which the adjustment rod 22a is engaged, and a tangential line (the rotating direction of the rotating friction plate 26) of a virtual arc, which has a center axis of the rotation support shaft 25 as a center and has a distance L between the adjustment rod 22a and the rotation support shaft 25 as a radius, is made to be substantially constant irrespective of the upper-lower position of the adjustment rod 22a. The angle θ is preferably 10° to 35°, more preferably 20° to 30°. A base end portion (a portion corresponding to a rotation shaft of the circular sector) of the rotating friction plate 26 is supported to the rotation support shaft 25 to be rotatably displaced about the rotation support shaft 25 such that when the adjustment rod 22a is positioned at an upper end portion of a moveable range in the upper-lower long hole 21a, the adjustment rod 22a and a rear end portion of the long guide hole 29 are engaged, and when the adjustment rod 22a is positioned at a lower end portion of the moveable range, the adjustment rod 22a and a front end portion of the long guide hole 29 are engaged.

Both side surfaces of the rotating friction plate 26 are surface-treated so as to increase the frictional coefficients with the outer surface of the support plate part 20a and the inner surface of the pressing part 24a. For example, surface roughening (shot blasting, knurling processing and the like) may be performed to increase surface roughness of both side surfaces of the rotating friction plate 26. Alternatively, the side surfaces may be covered with a frictional material. The frictional material is not particularly limited inasmuch as it increases the frictional coefficient of the side surface. For example, a polymer material such as an epoxy resin, a silicon rubber, a nitrile rubber and a fluorine-containing rubber, an adhesive, a ceramic coating and the like may be used.

In the first embodiment, when adjusting the upper-lower position or the front-rear position of the steering wheel 1, the adjustment lever 23 is rotated in a predetermined direction (generally, a downward direction), thereby expanding the interval between the pressing parts 24a, 24b. As a result, an inner diameter of the front end portion of the outer column 14a is elastically expanded due to the slit 27 of the displacement bracket 12a, so that a surface pressure of a fitting portion between an inner peripheral surface of the front end portion of the outer column 14a and an outer peripheral surface of the rear end portion of the inner column 15a is reduced or lost. At the same time, surface pressures of the contact portions between both side surfaces of the rotating friction plate 26 and the outer surface of the support plate part 20a and the inner surface of the pressing part 24a, surface pressures of contact portions between the inner surfaces of the support plate parts 20a, 20b and both side surfaces of the displacement bracket 12a, and a surface pressure of a contact portion between the outer surface of the other support plate part 20b and the inner surface of the other pressing part 24b are respectively reduced or lost. At this state, the position of the steering wheel 1 is adjusted within the displacement range of the adjustment rod 22a in the front-rear long hole 19a and the upper-lower long holes 21a, 21a.

Figure 3A:
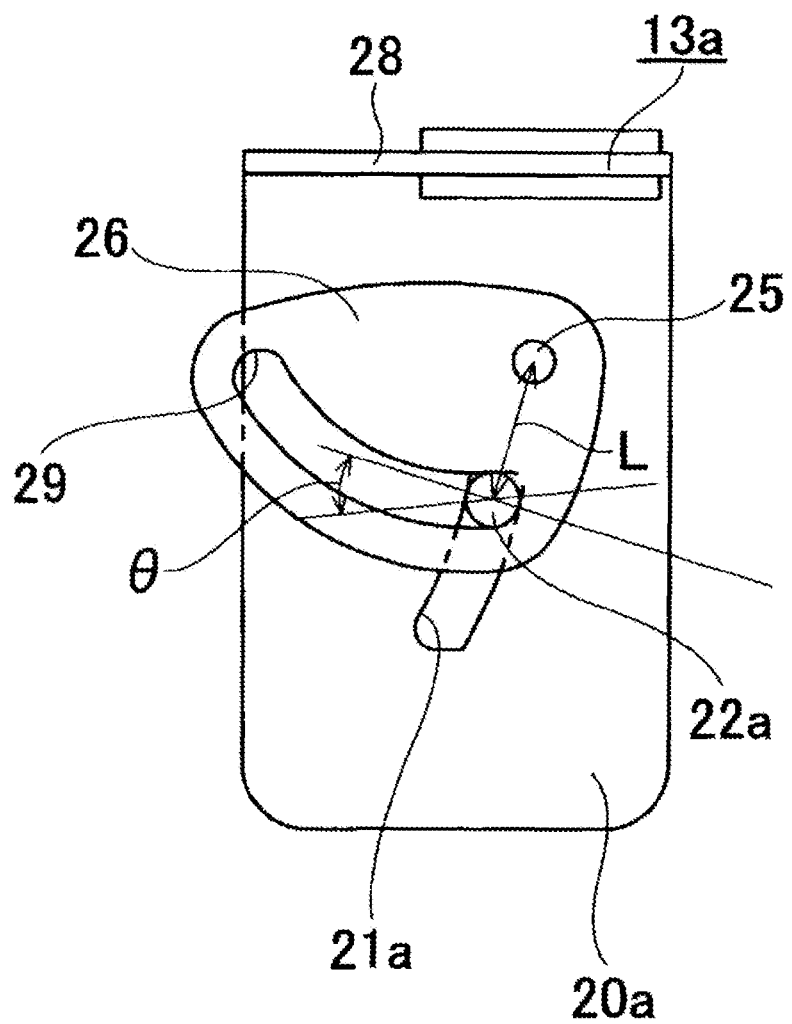
FIG. 3A is a side view illustrating a position of a rotating friction plate at a state where a steering wheel is moved to an upper end position of an adjustable range.
Figure 3B:
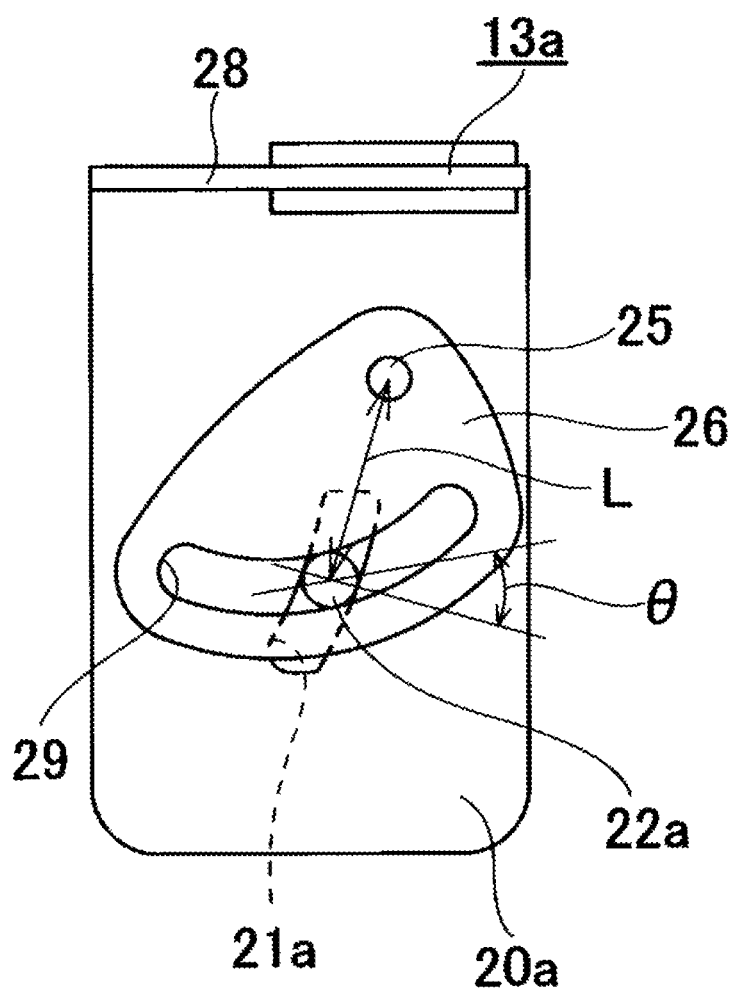
FIG. 3B is a side view illustrating a position of the rotating friction plate at a state where the steering wheel is moved to an intermediate position.

Subsequently the movement of the rotating friction plate 26, which is made when the steering wheel 1 (the steering column 6a) is displaced in the upper-lower direction so as to adjust the upper-lower position of the steering wheel 1 in the first embodiment as described above, is described. FIG. 3A illustrates a state where the steering wheel 1 is moved to an adjustable upper end position. At this state, the adjustment rod 22a is engaged with the upper end portion of the upper-lower long hole 21a and the rear end portion of the long guide hole 29. When the steering wheel 1 is displaced downwards from this state to lower the adjustment rod 22a, the distance L between the center axes of the adjustment rod 22a and the rotation support shaft 25 is increased, so that the rotating friction plate 26 is rotated about the rotation support shaft 25 in the counterclockwise direction of FIGS. 3A to 3C, as sequentially shown in FIG. 3A, FIG. 3B and FIG. 3C. At a state where the steering wheel 1 is moved to an adjustable lower end position, the adjustment rod 22a is engaged with the lower end portion of the upper-lower long hole 21a and the front end portion of the long guide hole 29, as shown in FIG. 3C. When the steering wheel 1 is displaced upwards from the lower end position to the upper end position, the rotating friction plate 26 is rotated reversely with the above downward displacement, as sequentially shown in FIG. 3C, FIG. 3B and FIG. 3A.

According to the steering wheel position adjustment device of the first embodiment as described above, it is possible to increase the force of holding the steering wheel 1 (refer to FIG. 19) at the adjusted position and to smoothly adjust the upper-lower position of the steering wheel 1. That is, according to the first embodiment, at the state where the interval of the pair of pressing parts 24a, 24b is contracted so as to hold the steering wheel 1 at the adjusted position, the rotating friction plate 26 is strongly interposed between the outer surface of the support plate part 20a and the inner surface of the pressing part 24a. When moving the upper-lower position of the steering wheel 1 from this state, both side surfaces of the rotating friction plate 26 are in strong friction with the outer surface of the support plate part 20a and the inner surface of the pressing part 24a. For example, when moving the steering wheel 1 from a state where the steering wheel 1 is kept at a desired position, it is necessary to rotate the rotating friction plate 26 while sliding the friction surfaces, which are both side surfaces of the rotating friction plate 26. For this reason, it is possible to increase the force of holding the steering wheel 1 at the adjusted position. As a result, it is possible to prevent the steering wheel 1 from being floated, which is caused as the adjustment rod 22a is upwardly displaced along the upper-lower long holes 21a, 21a provided in the support plate parts 20a, 20b due to the forward shock load applied to the steering wheel 1 upon the secondary collision. That is, it is possible to sufficiently protect the driver's body.

In the first embodiment, the structure capable of increasing the force of holding the steering wheel 1 at the adjusted position can be achieved only by one rotating friction plate 26 without overlapping a plurality of friction plates, unlike the structure disclosed in Patent Document 1. Therefore, it is possible to suppress the increases in the width size, the number of components and the weight of the steering wheel position adjustment device, unlike the structure disclosed in Patent Document 1, so that it is possible to size-reduce and lighten the steering wheel position adjustment device.

Further, the base end portion of the rotating friction plate 26 is rotatably supported to the rotation support shaft 25 on the side surface of the support plate part 20a, which is positioned on the extension line of the center line α of the upper-lower long hole 21a formed in the side surface of the support plate part 20a and above the upper-lower long hole 21a. For this reason, when adjusting the upper-lower position of the steering wheel 1, it is possible to reduce the frictional force which is to be applied to the engaging portions between the adjustment rod 22a and the upper-lower long hole 21a and between the adjustment rod 22a and the long guide hole 29 provided in the tip half portion of the rotating friction plate 26. The reason is described with reference to FIG. 4A and FIG. 4B.

Figure 4A:
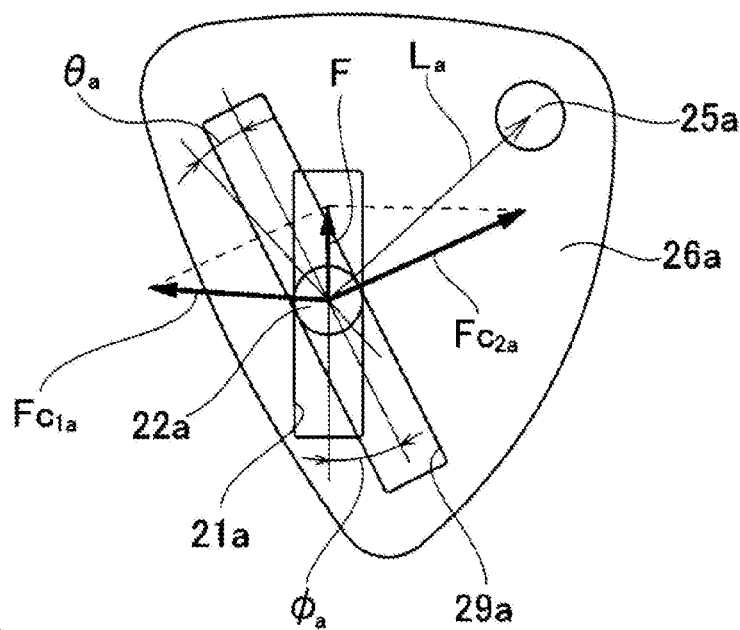
FIG. 4A is a schematic view illustrating an engaged state of an adjustment rod, a long guide hole and an upper-lower long hole in a related-art example.

FIG. 4A illustrates a structure where a rotation support shaft 25a configured to rotationally support a base end portion of a rotating friction plate 26a is provided at the rear (or the front) of an upper-lower long hole 21a. Also in the structure of the comparative example shown in FIG. 4A, at the engaging portion with the adjustment rod 22a, an angle θa between a longitudinal direction (a tangential direction of a long guide hole 29a) of the long guide hole 29a provided in a tip half portion of the rotating friction plate 26a and a tangential line (a rotating direction of the rotating friction plate 26a) of a virtual arc having a distance La between the adjustment rod 22a and the rotation support shaft 25a as a radius is made to be substantially constant (preferably, 10° to 35°, and more preferably 20° to 30°) irrespective of the upper-lower position of the adjustment rod 22a. In case of the structure of the comparative example, at the engaging portion with the adjustment rod 22a, an angle φa between a longitudinal direction (a tangential direction of the upper-lower long hole 21a) the upper-lower long hole 21a and a longitudinal direction (a tangential direction of the long guide hole 29a) of the long guide hole 29a is relatively smaller (about 20° to 30°), irrespective of the upper-lower position of the steering wheel 1. For this reason, when adjusting the upper-lower position of the steering wheel 1, a wedge effect is caused in the engaging portions (sliding contact portions) between the outer peripheral surface of the adjustment rod 22a and the inner peripheral edge of the upper-lower long hole 21a and between the outer peripheral surface of the adjustment rod 22a and the inner peripheral edge of the long guide hole 29a, so that the frictional force to be applied to the engaging portions is increased. That is, when the force, which is to be applied to the adjustment rod 22a as the steering wheel 1 is displaced upwards, is denoted as F, a pressing force (normal force) Fc1a which is to be applied to the engaging portion of the outer peripheral surface of the adjustment rod 22a and the inner peripheral edge of the upper-lower long hole 21a and a pressing force Fc2a which is to be applied to the engaging portion of the outer peripheral surface of the adjustment rod 22a and the inner peripheral edge of the long guide hole 29a are the same, and can be expressed by the following Equation (1).

[Equation 1]

$$Fc_{1a} = Fc_{2a} = \frac{1}{\sin\phi_a}F \quad (1)$$

When the frictional coefficient of each engaging portion is denoted as µ, a frictional force Fs1a which is to be applied to the engaging portion between the outer peripheral surface of the adjustment rod 22a and the inner peripheral edge of the upper-lower long hole 21a and a frictional force Fs2a which is to be applied to the engaging portion between the outer peripheral surface of the adjustment rod 22a and the inner peripheral edge of the long guide hole 29a are also the same and can be expressed by the following Equation (2).

[Equation 2]

$$Fs_{1a} = Fs_{2a} = \frac{\mu}{\sin\phi_a}F \quad (2)$$

Therefore, in the structure of the comparative example, a frictional resistance Fsa (a sum of the frictional force Fs1a and a longitudinal direction component of the upper-lower long hole 21a of the frictional force Fs2a) against the upward displacement of the adjustment rod 22a in the upper-lower long hole 21a can be calculated by the following Equation (3).

[Equation 3]

$$Fs_a = Fs_{1a} + Fs_{2a}\cos\phi_a = \frac{\mu(1+\cos\phi_a)}{\sin\phi_a}F \quad (3)$$

Figure 4B:
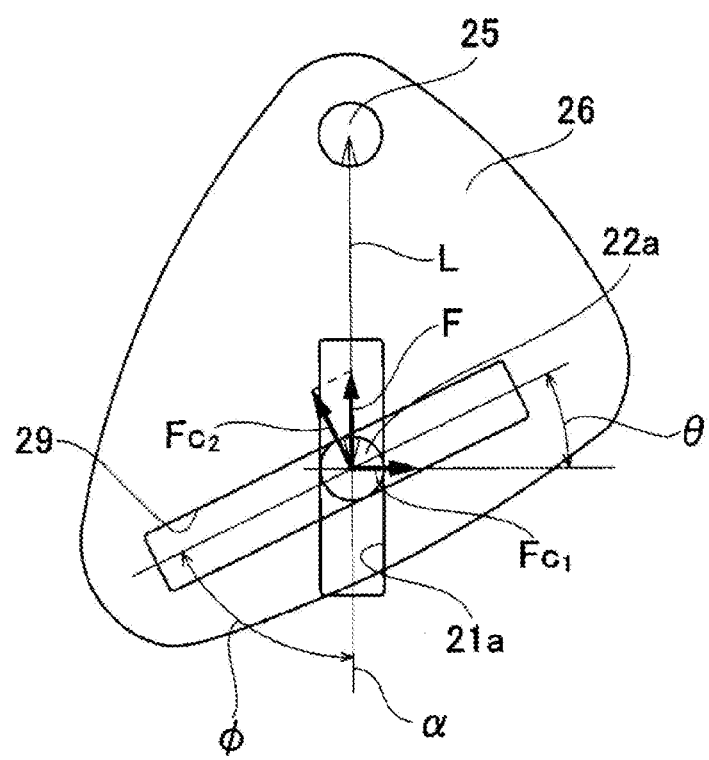
FIG. 4B is a schematic view illustrating an engaged state of an adjustment rod, a long guide hole and an upper-lower long hole of an embodiment of the present invention.

In contrast, according to the steering wheel position adjustment device of the first embodiment, as shown in FIG. 4B, the rotation support shaft 25 is provided on the extension line the center line α of the upper-lower long hole 21a and above the upper-lower long hole 21a. For this reason, an angle φ (=90°−θ) between the longitudinal direction (the tangential direction of the upper-lower long hole 21a) of the upper-lower long hole 21a and the longitudinal direction (the tangential direction of the long guide hole 29) of the long guide hole 29 at the engaging portion with the adjustment rod 22a can be made to be greater than the configuration where the rotation support shaft 25a is provided at the rear (or the front) of the upper-lower long hole 21a, like the structure of the comparative example. For this reason, when adjusting the upper-lower position of the steering wheel 1, it is possible to suppress the wedge effect occurring at the engaging portions between the outer peripheral surface of the adjustment rod 22a and the inner peripheral edge of the upper-lower long hole 21a and between the outer peripheral surface of the adjustment rod 22a and the inner peripheral edge of the long guide hole 29a. As a result, when the force, which is to be applied to the adjustment rod 22a as the steering wheel 1 is displaced upwards, is denoted as F, the pressing force (normal force) Fc1 which is to be applied to the engaging portion between the outer peripheral surface of the adjustment rod 22a and the inner peripheral edge of the upper-lower long hole 21a, and the pressing force Fc2 which is to be applied to the engaging portion between the outer peripheral surface of the adjustment rod 22a and the inner peripheral edge of the long guide hole 29 can be expressed by the following Equations (4) and (5).

[Equation 4]

$$Fc_1 = F\cos\phi\sin\phi \quad (4)$$

[Equation 5]

$$Fc_2 = F\sin\phi \quad (5)$$

When the frictional coefficient of each engaging portion is denoted as µ, the frictional force Fs1 which is to be applied to the engaging portion between the outer peripheral surface of the adjustment rod 22a and the inner peripheral edge of the upper-lower long hole 21a, and the frictional force Fs2 which is to be applied to the engaging portion between the outer peripheral surface of the adjustment rod 22a and the inner peripheral edge of the long guide hole 29 can be expressed by the following Equations (6) and (7).

[Equation 6]

$$Fs_1 = \mu F\cos\phi\sin\phi \quad (6)$$

[Equation 7]

$$Fs_2 = \mu F\sin\phi \quad (7)$$

Therefore, according to the steering wheel position adjustment device of the first embodiment, the frictional resistance Fs against the upward displacement of the adjustment rod 22a in the upper-lower long hole 21a can be calculated by the following equation (8).

[Equation 8]

$$Fs = Fs_1 + Fs_2\cos\phi = 2\mu\cos\phi\sin\phi F \quad (8)$$

Here, according to the structure of the first embodiment, the angle φ between the longitudinal direction of the upper-lower long hole 21a and the longitudinal direction of the long guide hole 29 is 55° to 80°. In contrast, according to the structure of the comparative example, the angle φa between the longitudinal direction of the upper-lower long hole 21a and the longitudinal direction of the long guide hole 29a is 20° to 30°. Therefore, as can be clearly seen from the equations (3) and (8), it is possible to decrease the frictional resistance Fs against the upward displacement of the adjustment rod 22a in the upper-lower long hole 21a in the structure of the first embodiment, as compared to the frictional resistance Fsa in the structure of the comparative example shown in FIG. 4A (Fs<Fsa). That is, according to the first embodiment, when the frictional coefficient μ is set to 0.15 and the angle φ is set to 65° (θ: 25°), for example, the frictional resistance Fs is about 0.1 F from the Equation (8). In contrast, according to the comparative example, when the angle φa is set to 25°, the frictional resistance Fsa is about 0.7 F from the Equation (3). That is, according to the steering wheel position adjustment device of the first embodiment, when adjusting the upper-lower position of the steering wheel 1, it is possible to decrease the frictional resistance Fs against the upper-lower displacement of the adjustment rod 22a, as compared to the structure of the comparative example, so that it is possible to smoothly adjust the upper-lower position of the steering wheel 1.

According to the first embodiment, the rotating friction plate 26 is interposed between the outer surface of the support plate part 20a and the inner surface of the pressing part 24a. However, the rotating friction plate 26 may be interposed between the side surface (the outer surface or the inner surface) of any of the support plate parts 20a, 20b and the opposing surface (the inner surface of any of the pressing parts 24a, 24b or the outer surface of the displacement bracket 12a) facing the side surface. The rotating friction plate 26 may be interposed at two and four portions therebetween. In any case, the rotation support shaft configured to rotatably support the base end portion of the rotating friction plate is provided on the side surface of the support plate part which is displaced relative to the adjustment rod when adjusting the upper-lower position of the steering wheel.

Figure 5A:
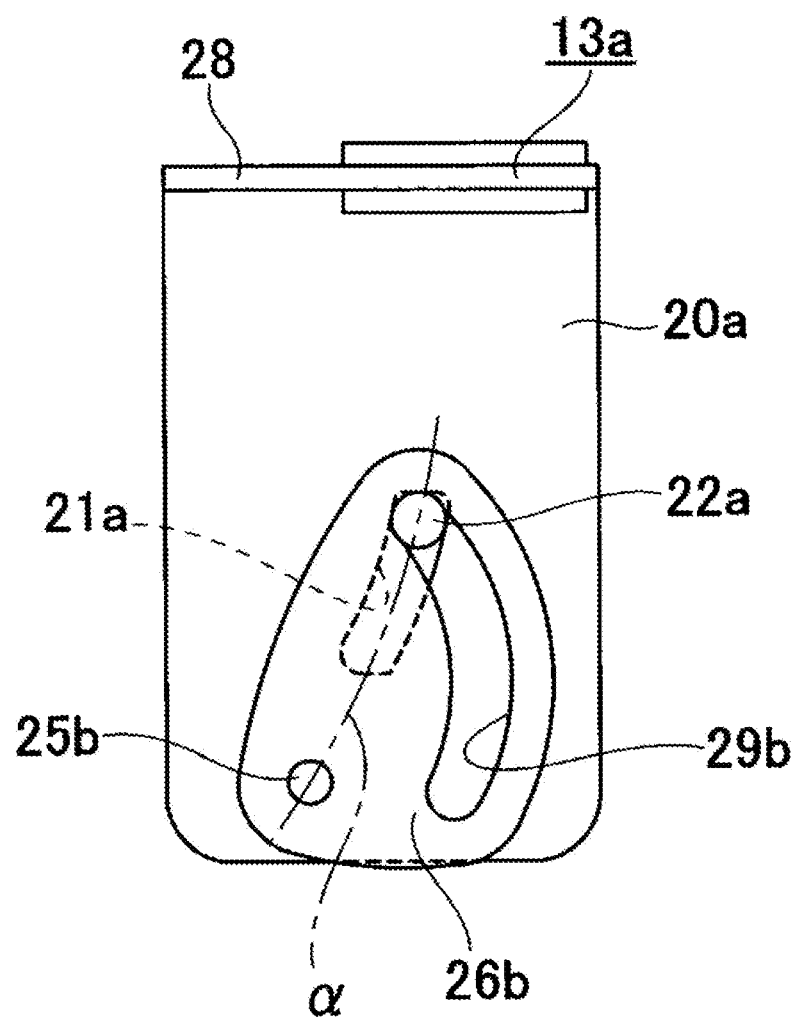
FIG. 5A is a side view illustrating a position of the rotating friction plate according to a second embodiment of the present invention at a state where the steering wheel is moved to the upper end position of the adjustable range.
Figure 5B:
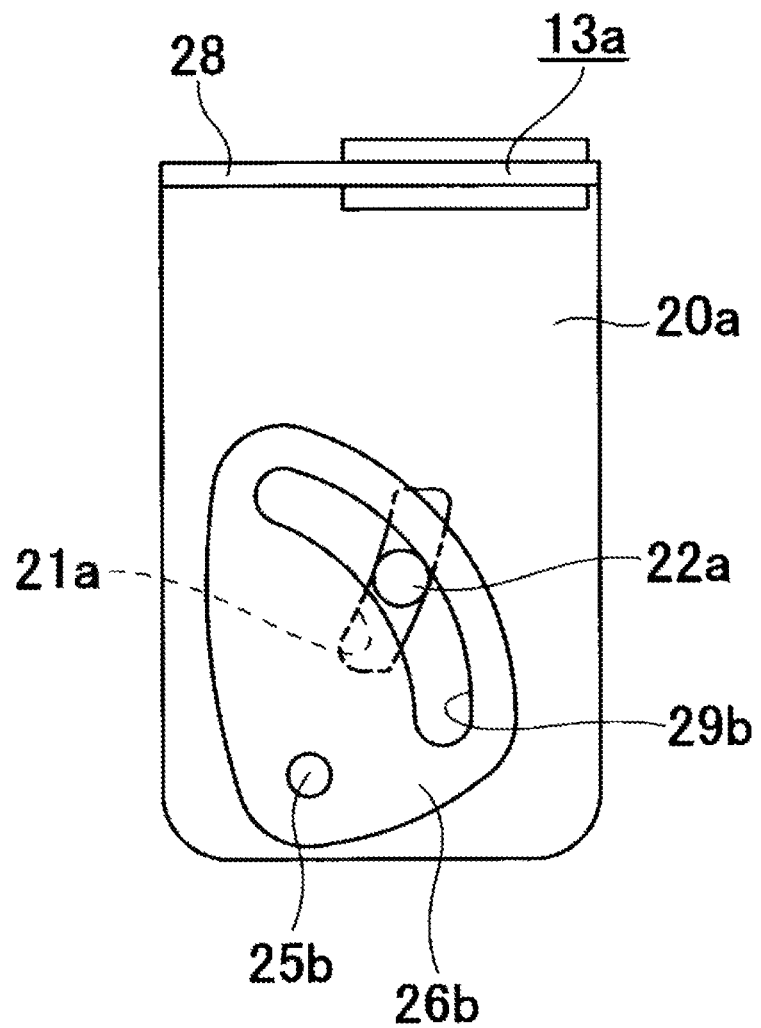
FIG. 5B is a side view illustrating a position of the rotating friction plate at a state where the steering wheel is moved to the intermediate position.
Figure 5C:
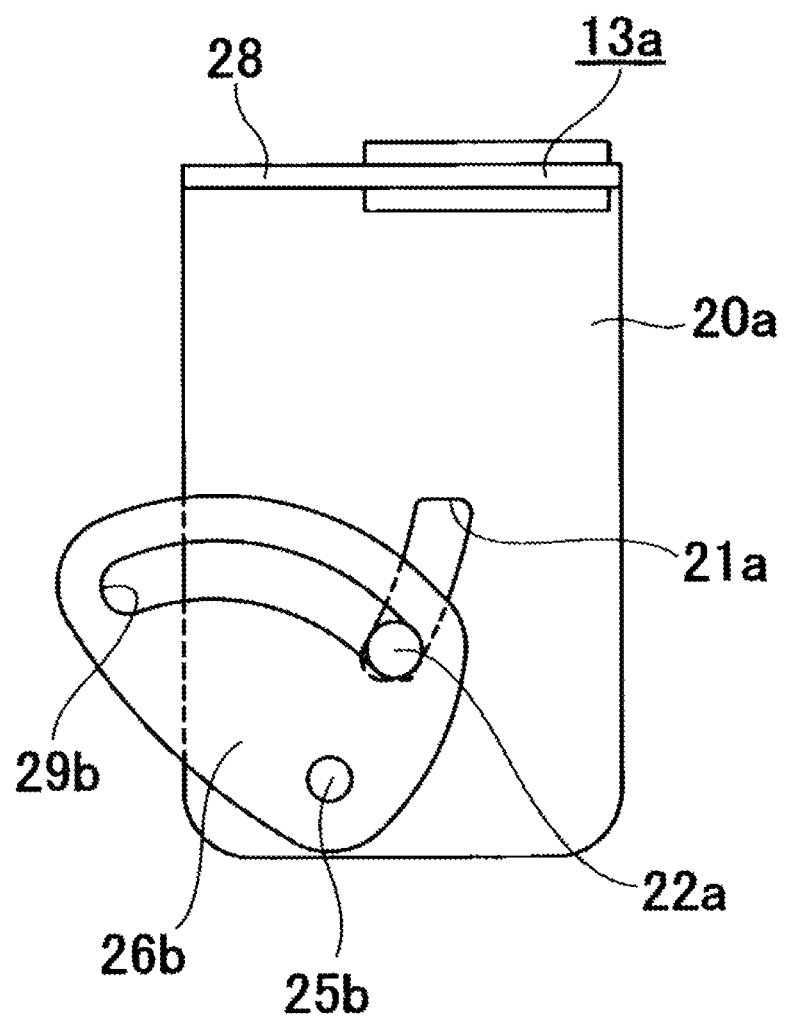
FIG. 5C is a side view illustrating a position of the rotating friction plate at a state where the steering wheel is moved to the lower end position.
Figure 6:
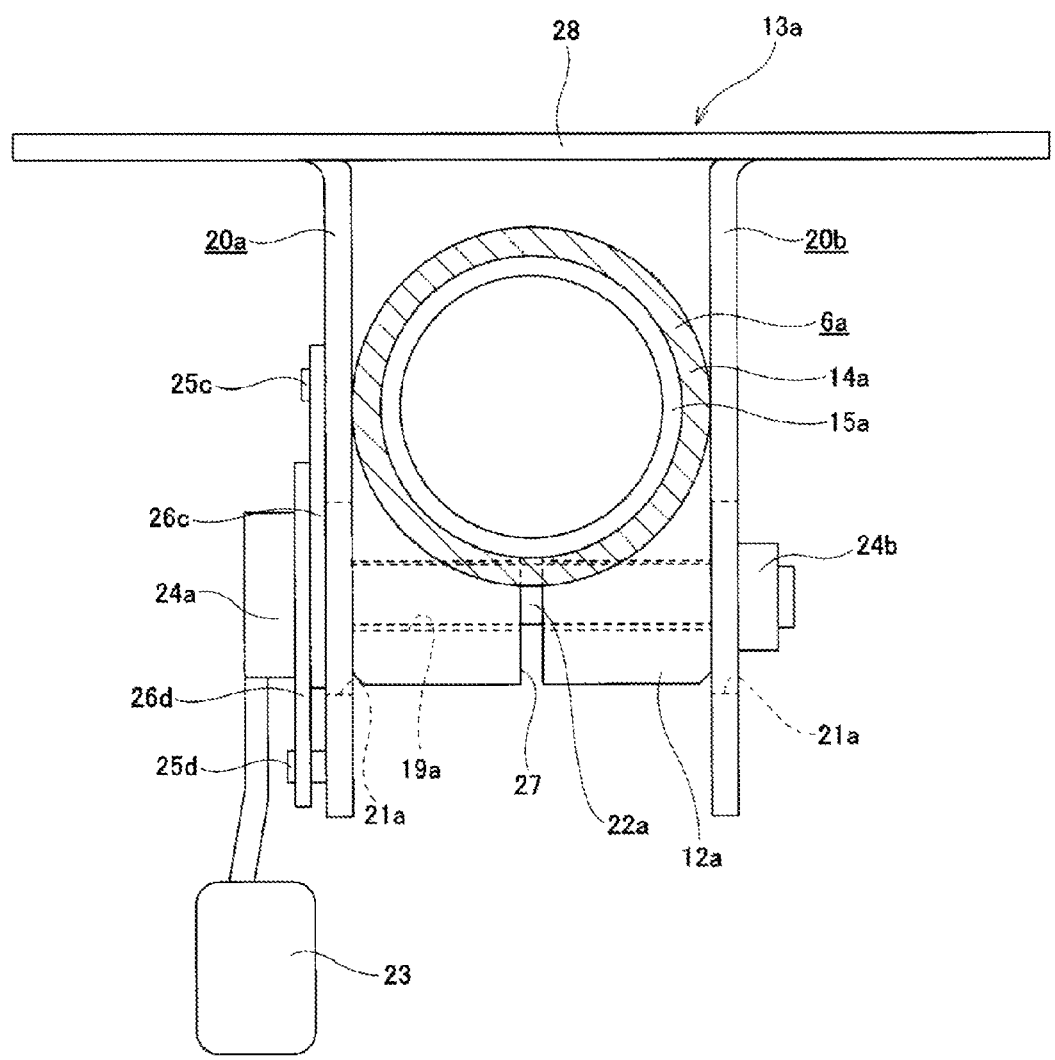
FIG. 6 is a view similar to FIG. 2, illustrating a third embodiment of the present invention.

FIGS. 5A to 5C illustrate a second embodiment of the present invention. According to the second embodiment, a rotation support shaft 25b is provided at a portion on the outer surface of the support plate part 20a of the support bracket 13a, which is positioned on the extension line of the center line α (refer to FIG. 5A) of the upper-lower long hole 21a formed in the support plate part 20a and below the upper-lower long hole 21a. A rotating friction plate 26b is interposed between the outer surface of the support plate part 20a and the inner surface of the pressing part 24a (refer to FIG. 2). The adjustment rod 22a is inserted into a long guide hole 29b formed in a tip half portion (wide width portion) of the rotating friction plate 26b. The long guide hole 29b has a partial arc shape having, as a center, a point positioned in front of the center line α and below the rotation support shaft 25b at a state (refer to a state shown in FIG. 5B) where the adjustment rod 22a is positioned at a center in the upper-lower long hole 21a. A base end portion of the rotating friction plate 26b is supported to the rotation support shaft 25b to be rotatably displaced about the rotation support shaft 25b such that when the adjustment rod 22a is positioned at the upper end portion of the moveable range in the upper-lower long hole 21a, the adjustment rod 22a and the front end portion of the long guide hole 29b are engaged, and when the adjustment rod 22a is positioned at the lower end portion of the moveable range, the adjustment rod 22a and the rear end portion of the long guide hole 29b are engaged.

At a state where the steering wheel 1 (refer to FIG. 19) is moved to the adjustable upper end position, the adjustment rod 22a is engaged with the upper end portion of the upper-lower long hole 21a and the front end portion of the long guide hole 29b, as shown in FIG. 5A. Therefore, when the steering wheel 1 is displaced downwards from this state, the distance L between the center axes of the adjustment rod 22a and the rotation support shaft 25b is decreased, so that the rotating friction plate 26b is rotated about the rotation support shaft 25b in the counterclockwise direction of FIGS. 5A to 5C, as sequentially shown in FIG. 5A, FIG. 5B and FIG. 5C. At a state where the steering wheel 1 is moved to the adjustable lower end position, the adjustment rod 22a is engaged with the lower end portion of the upper-lower long hole 21a and the rear end portion of the long guide hole 29b, as shown in FIG. 5C. When the steering wheel 1 is displaced upwards from the lower end position to the upper end position, the rotating friction plate 26b is rotated reversely with the above downward displacement, as sequentially shown in FIG. 5C, FIG. 5B and FIG. 5A. Since the other configurations and operations are the same as the first embodiment, the overlapping descriptions are omitted.

FIGS. 6 to 8B illustrate a third embodiment of the present invention. The steering wheel position adjustment device of the third embodiment has a pair of rotation support shafts 25c, 25d and a pair of rotating friction plates 26c, 26d. The one rotation support shaft 25c (the upper rotation support shaft in FIGS. 7A to 7C) is provided at a portion on the outer surface of the support plate part 20a of the support bracket 13a, which is positioned on the extension line of the center line α (refer to FIG. 7A) of the upper-lower long hole 21a formed in the support plate part 20a and above the upper-lower long hole 21a. The other rotation support shaft 25d (the lower rotation support shaft in FIGS. 7A to 7C) is provided at a portion on the outer surface of the support plate part 20a, which is positioned on the extension line of the center line α of the upper-lower long hole 21a and below the upper-lower long hole 21a. The rotating friction plates 26c, 26d are interposed with the tip half portions thereof being overlapped between the outer surface of the support plate part 20a and the inner surface of the pressing part 24a. The adjustment rod 22a is inserted into long guide holes 29c, 29d formed in the respective tip half portions of the rotating friction plates 26c, 26d. The long guide hole 29c formed in the rotating friction plate 26c has a partial arc shape having, as a center, a point positioned in front of the center line α and above the one rotation support shaft 25c at a state (refer to the state shown in FIG. 7B) where the adjustment rod 22a is positioned at the center in the upper-lower long hole 21a. A base end portion of the rotating friction plate 26c is supported to the rotation support shaft 25c to be rotatably displaced about the rotation support shaft 25c such that when the adjustment rod 22a is positioned at the upper end portion of the moveable range in the upper-lower long hole 21a, the adjustment rod 22a and the rear end portion of the long guide hole 29c are engaged, and when the adjustment rod 22a is positioned at the lower end portion of the moveable range, the adjustment rod 22a and the front end portion of the long guide hole 29c are engaged. In the meantime, the long guide hole 29d formed in the other rotating friction plate 26d has a partial arc shape having, as a center, a point positioned in front of the center line α and below the other rotation support shaft 25d at a state (refer to the state shown in FIG. 7B) where the adjustment rod 22a is positioned at the center in the upper-lower long hole 21a. A base end portion of the rotating friction plate 26d is supported to the rotation support shaft 25d to be rotatably displaced about the rotation support shaft 25d such that when the adjustment rod 22a is positioned at the upper end portion of the moveable range in the upper-lower long hole 21a, the adjustment rod 22a and the front end portion of the long guide hole 29d are engaged, and when the adjustment rod 22a is positioned at the lower end portion of the moveable range, the adjustment rod 22a and the rear end portion of the long guide hole 29d are engaged.

Figure 7A:
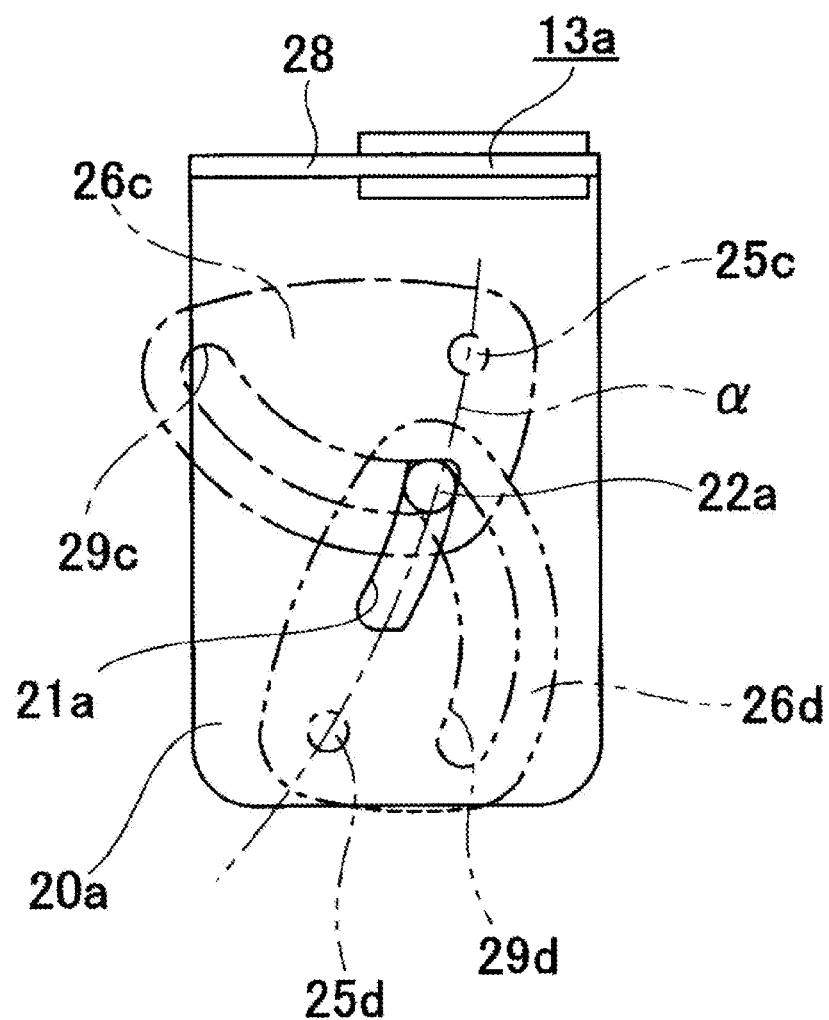
FIG. 7A is a side view illustrating a position of the rotating friction plate according to the third embodiment of the present invention at a state where the steering wheel is moved to the upper end position of the adjustable range.
Figure 7B:
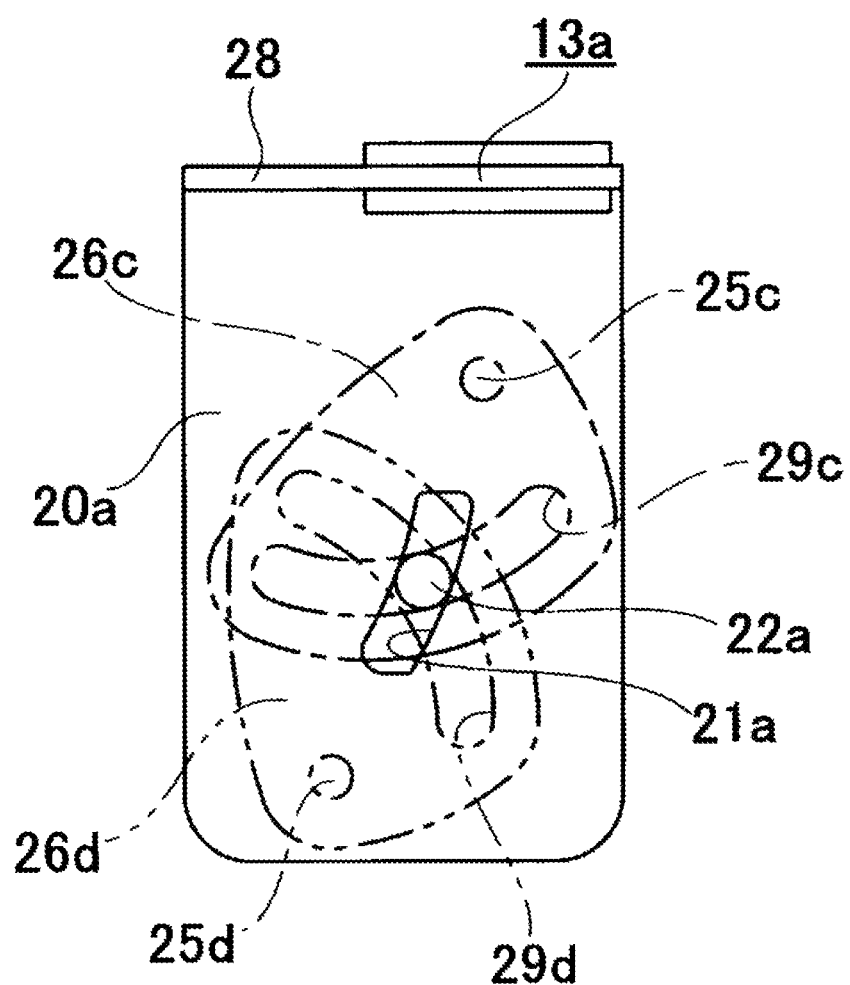
FIG. 7B is a side view illustrating a position of the rotating friction plate at a state where the steering wheel is moved to the intermediate position.

According to the third embodiment, as the upper-lower position of the steering wheel 1 (refer to FIG. 19) is adjusted, the one rotating friction plate 26c is rotated like the rotating friction plate 26 of the first embodiment, and the other rotating friction plate 26d is rotated like the rotating friction plate 26b of the second embodiment. That is, at a state where the steering wheel 1 is moved to the adjustable upper end position, the adjustment rod 22a is engaged with the upper end portion of the upper-lower long hole 21a, the rear end portion of the one long guide hole 29c and the front end portion of the other long guide hole 29d, as shown in FIG. 7A. When the steering wheel 1 is displaced downwards from this state, the rotating friction plates 26c, 26d are rotated about the rotation support shafts 25c, 25d in the counter-clockwise direction of FIGS. 7A to 7C, respectively, as sequentially shown in FIG. 7A, FIG. 7B and FIG. 7C. At a state where the steering wheel 1 is moved to the adjustable lower end position, the adjustment rod 22a is engaged with the lower end portion of the upper-lower long hole 21a, the front end portion of the one long guide hole 29c and the rear end portion of the other long guide hole 29d, as shown in FIG. 7C. When the steering wheel 1 is displaced upwards from the lower end position to the upper end position, the rotating friction plates 26c, 26d are rotated reversely with the above downward displacement, as sequentially in FIG. 7C, FIG. 7B and FIG. 7A.

Figure 8A:
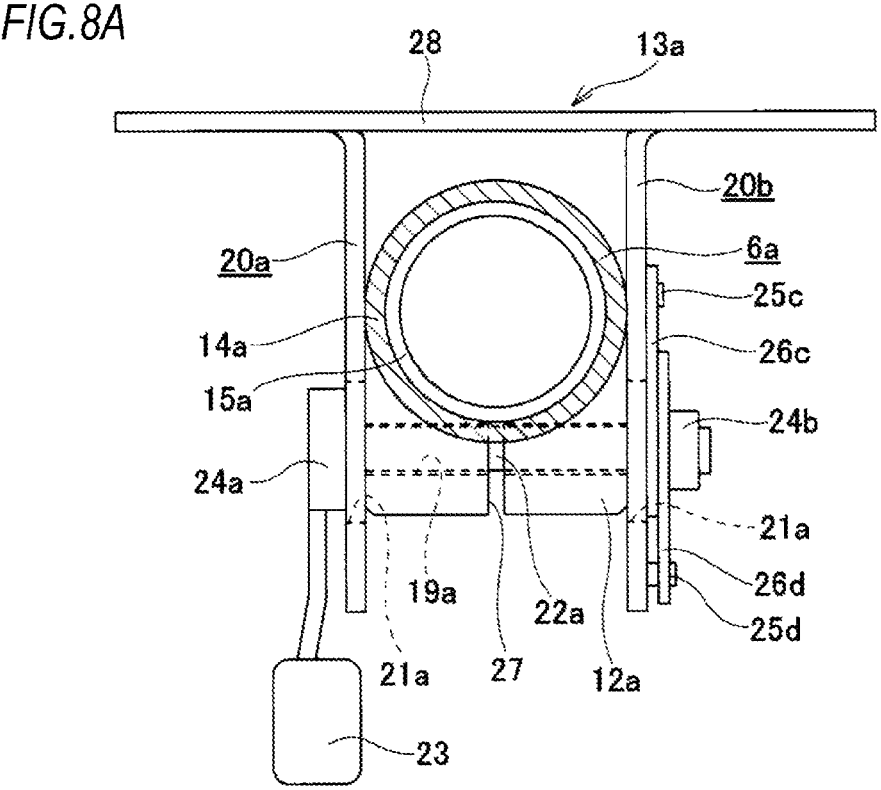
FIG. 8A is a view similar to FIG. 2, illustrating another example of the mounting position of the rotating friction plate.
Figure 8B:
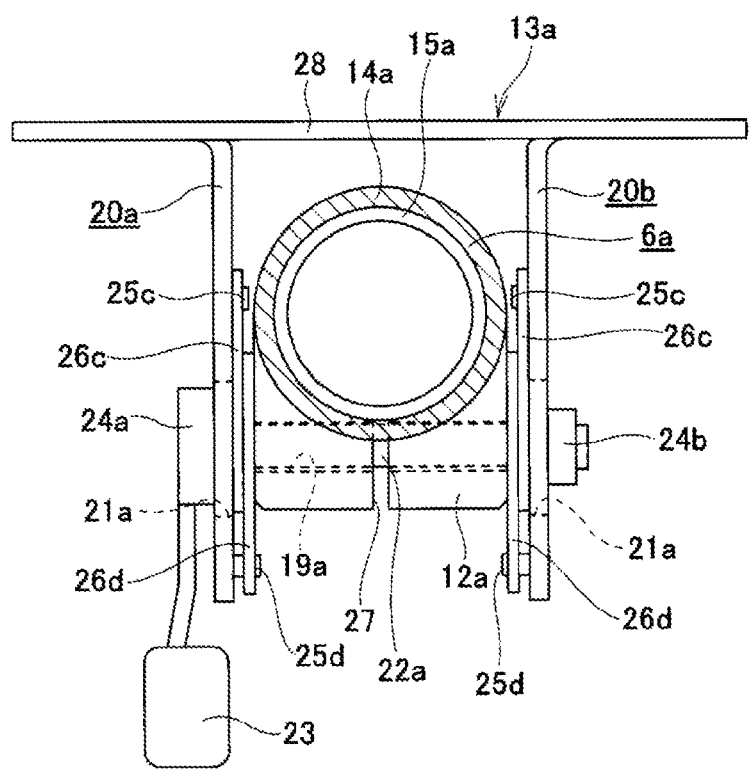
FIG. 8B is a view illustrating a still another example of the mounting position of the rotating friction plate.

According to the third embodiment, the pair of rotating friction plates 26c, 26d may be interposed between the side surfaces of the support plate parts 20a, 20b and the opposing surfaces facing the side surfaces, without being limited to between the outer surface of the support plate part 20a and the inner surface of the pressing part 24a, like the first embodiment. The rotating friction plates 26c, 26d may be interposed at two or four portions therebetween by one set, respectively. For example, the pair of rotating friction plates 26c, 26d may be interposed between the outer surface of the support plate part 20b and the inner surface of the pressing part 24b, as shown in FIG. 8A or may be interposed between the inner surfaces of the pair of support plate parts 20a, 20b and both side surfaces of the displacement bracket 12a by one set, respectively, as shown in FIG. 8B. Since the other configurations and operations are the same as the first and second embodiments, the overlapping descriptions are omitted.

Figure 9:
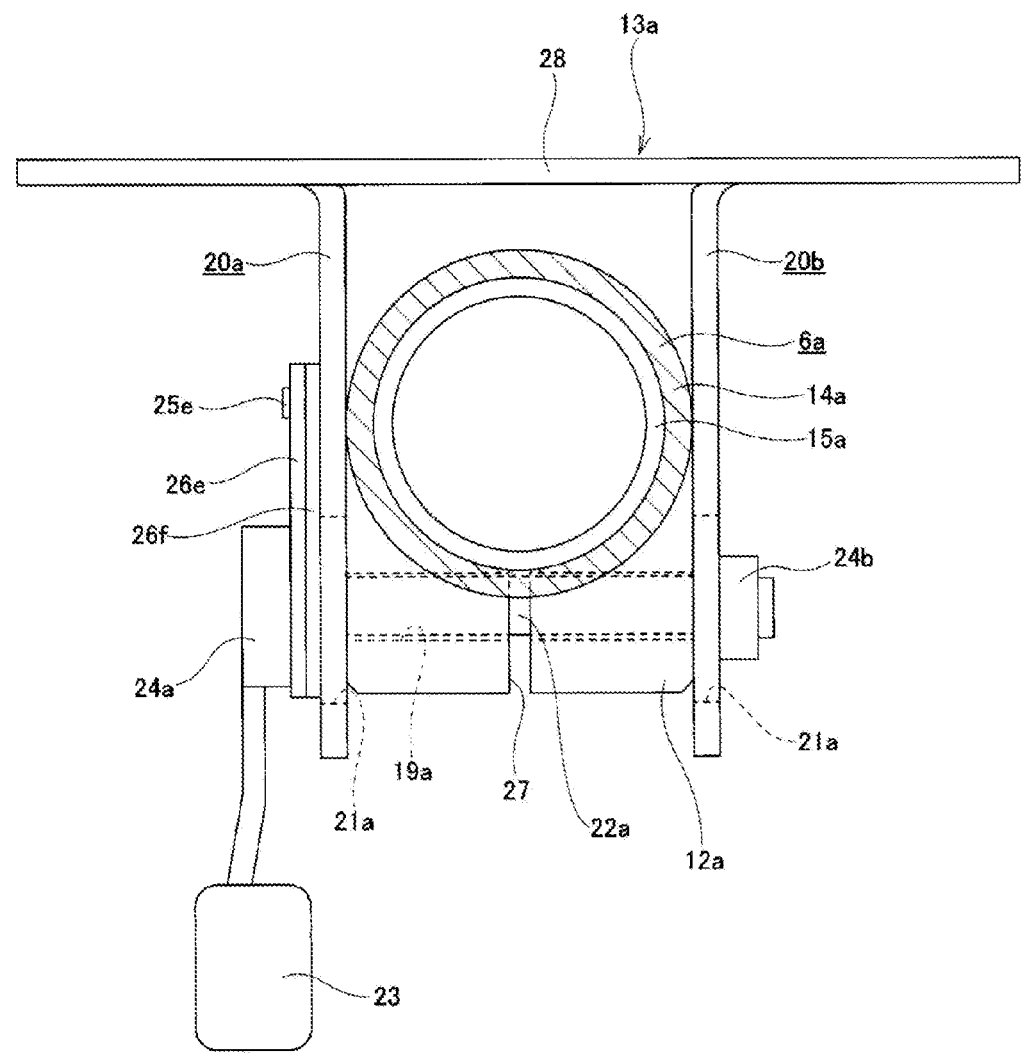
FIG. 9 is a view similar to FIG. 2, illustrating a fourth embodiment of the present invention.
Figure 10A:
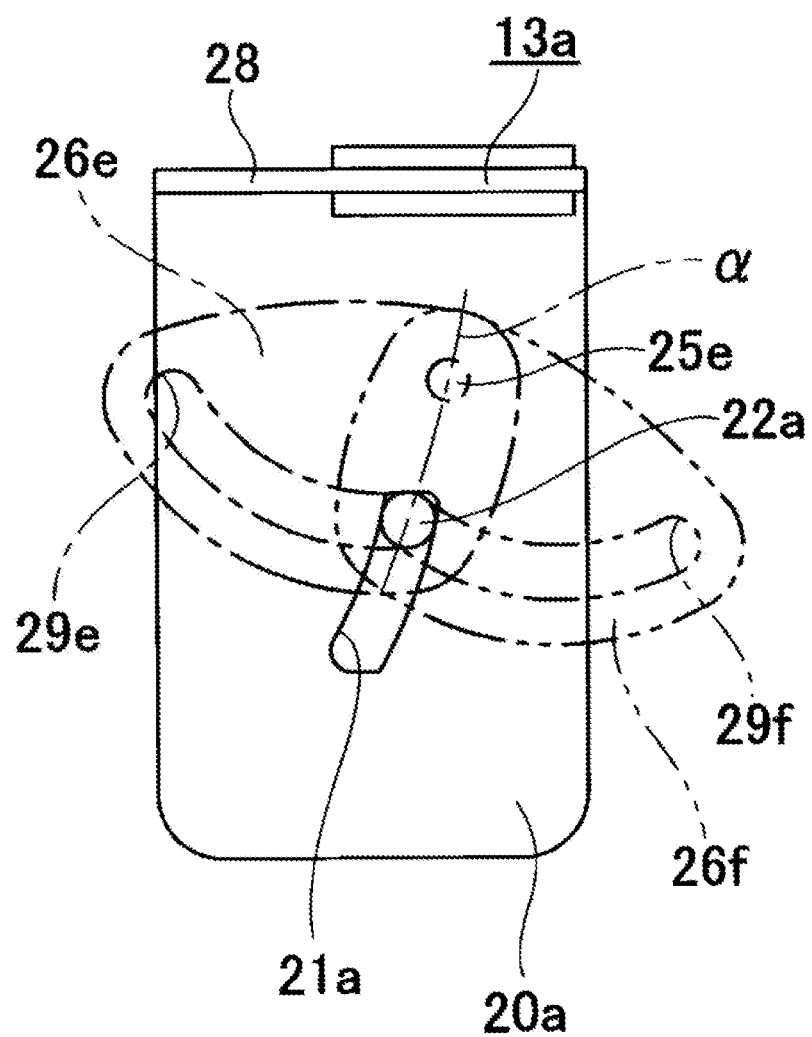
FIG. 10A is a side view illustrating a position of the rotating friction plate according to the fourth embodiment at a state where the steering wheel is moved to the upper end position of the adjustable range.
Figure 10B:
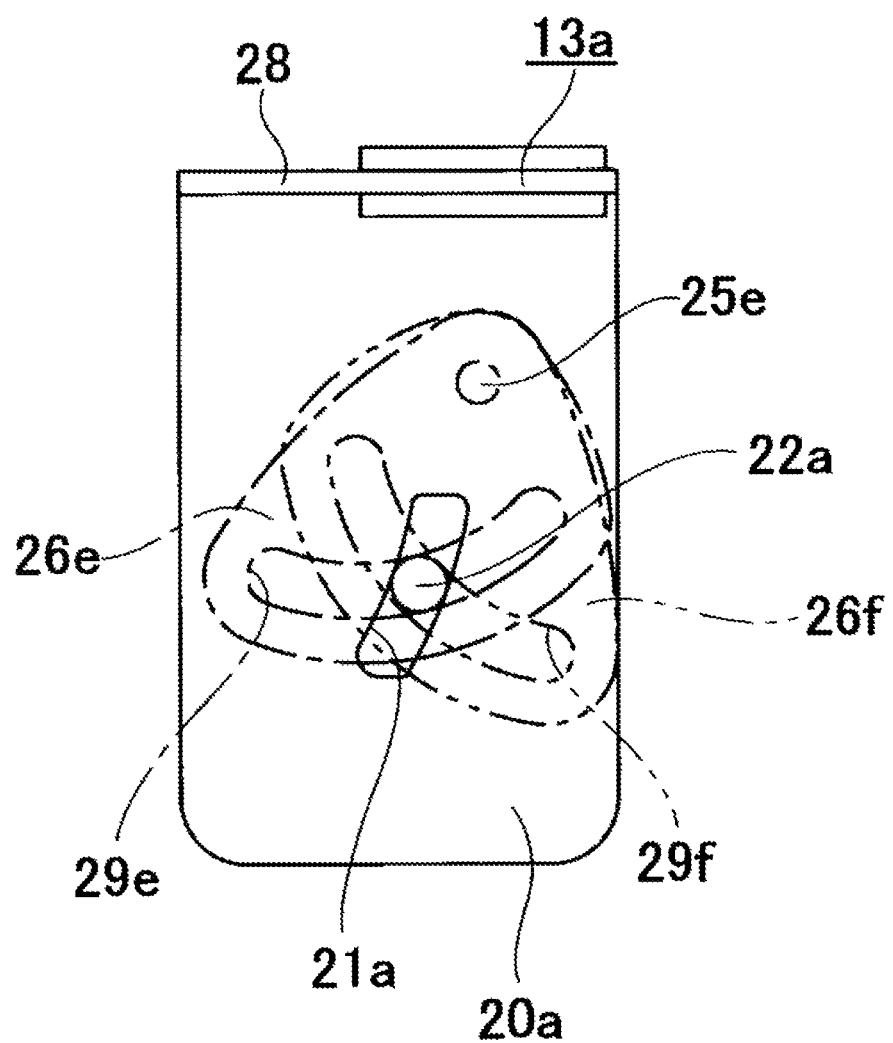
FIG. 10B is a side view illustrating a position of the rotating friction plate at a state where the steering wheel is moved to the intermediate position.
Figure 10C:
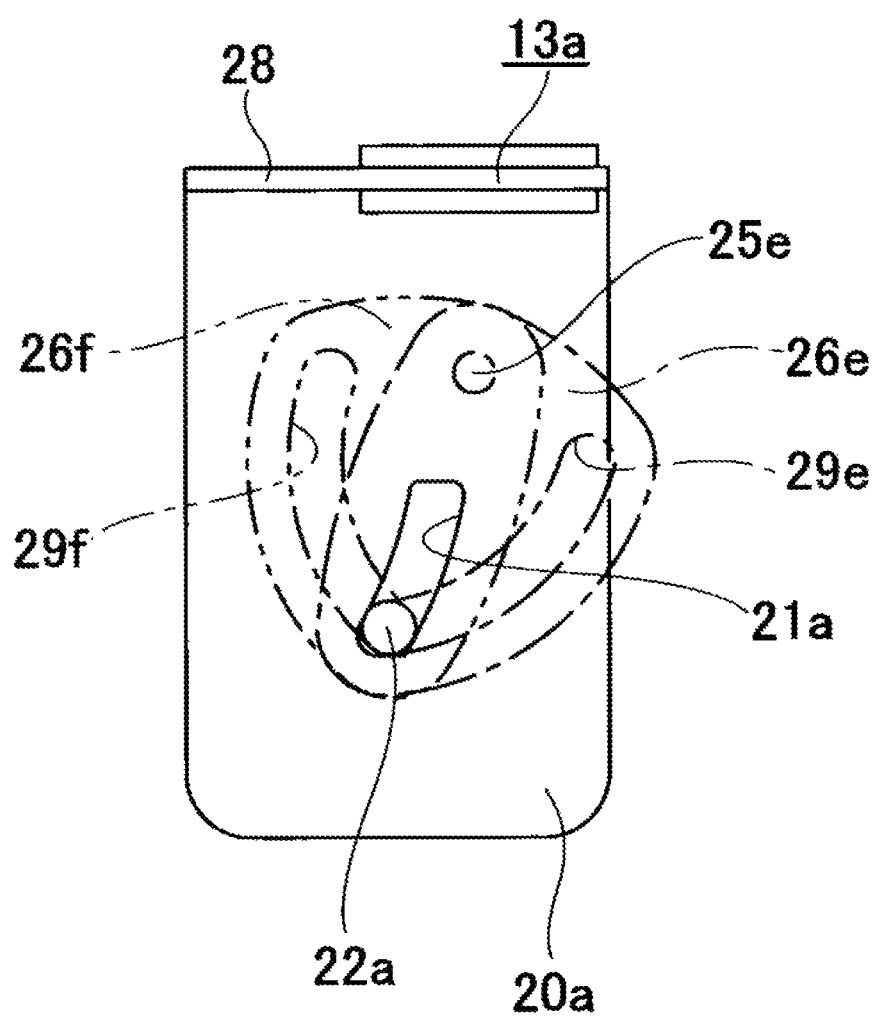
FIG. 10C is a side view illustrating a position of the rotating friction plate at a state where the steering wheel is moved to the lower end position.

FIGS. 9 to 10C illustrate a fourth embodiment of the present invention. The steering wheel position adjustment device of the fourth embodiment has a rotation support shaft 25e and a pair of rotating friction plate 26e, 26f. The rotation support shaft 25e is provided at a portion on the outer surface of the support plate part 20a of the support bracket 13a, which is positioned on the extension line of the center line α (refer to FIG. 10A) of the upper-lower long hole 21a formed in the support plate part 20a and above the upper-lower long hole 21a. The rotating friction plates 26e, 26f are interposed with being overlapped with each other between the outer surface of the support plate part 20a and the inner surface of the pressing part 24a. The adjustment rod 22a is inserted into long guide holes 29e, 29f formed in respective tip half portions of the rotating friction plates 26e, 26f. The long guide hole 29e formed in the rotating friction plate 26e has a partial arc shape having, as a center, a point positioned in front of the center line α and above the rotation support shaft 25e at a state (refer to the state shown in FIG. 10B) where the adjustment rod 22a is positioned at the center in the upper-lower long hole 21a. The long guide hole 29f formed in the other rotating friction plate 26f has a partial arc shape having, as a center, a point positioned at the rear of the center line α and above the rotation support shaft 25e at a state (refer to the state shown in FIG. 10B) where the adjustment rod 22a is positioned at the center in the upper-lower long hole 21a. Base end portions of the rotating friction plates 26e, 26f are supported to the rotation support shaft 25e to be rotatably displaced about the rotation support shaft 25e such that when adjusting the upper-lower position of the steering wheel 1 (refer to FIG. 19) in one direction, the rotating friction plates 26e, 26f are rotated in opposite directions.

That is, at a state where the steering wheel 1 is moved to the adjustable upper end position, the adjustment rod 22a is engaged with the upper end portion of the upper-lower long hole 21a, the rear end portion of the one long guide hole 29e and the front end portion of the other long guide hole 29f, as shown in FIG. 10A. When the steering wheel 1 is displaced downwards from this state, the one rotating friction plate 26e is rotated about the rotation support shaft 25e in the counterclockwise direction of FIGS. 10A to 10C and the other rotating friction plate 26f is rotated about the rotation support shaft 25e in the clockwise direction of FIGS. 10A to 10C, respectively, as sequentially shown in FIG. 10A, FIG. 10B and FIG. 10C. At a state where the steering wheel 1 is moved to the adjustable lower end position, the adjustment rod 22a is engaged with the lower end portion of the upper-lower long hole 21a, the front end portion of the one long guide hole 29e and the rear end portion of the other long guide hole 29f, as shown in FIG. 10C. When the steering wheel 1 is displaced upwards from the lower end position to the upper end position, the rotating friction plates 26e, 26f are rotated reversely with the above downward displacement, as sequentially shown in FIG. 10C, FIG. 10B and FIG. 10A.

When implementing the steering wheel position adjustment device of the fourth embodiment, the pair of rotating friction plates 26e, 26f may be interposed between the side surfaces of the support plate parts 20a, 20b and the opposing surfaces facing the side surfaces, without being limited to between the outer surface of the support plate part 20a and the inner surface of the pressing part 24a. The rotating friction plates 26e, 26f may be interposed at two or four portions therebetween by one set, respectively. Since the other configurations and operations are the same as the first embodiment, the overlapping descriptions are omitted.

Figure 11:
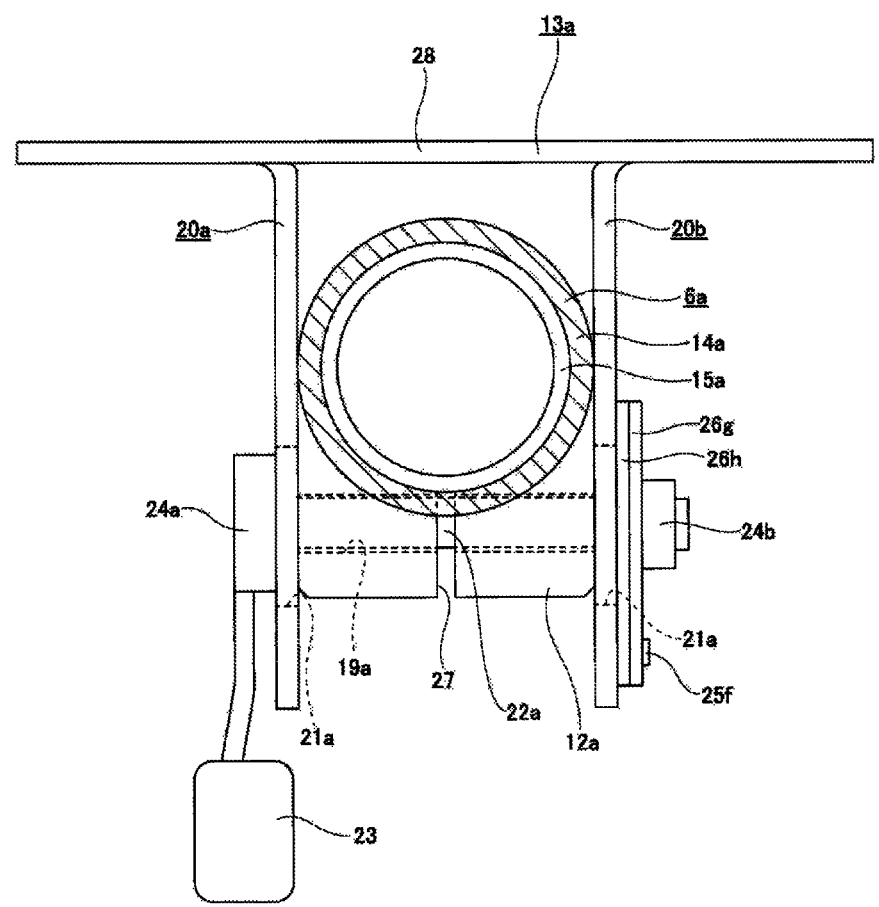
FIG. 11 is a view similar to FIG. 2, illustrating a fifth embodiment of the present invention.
Figure 12A:
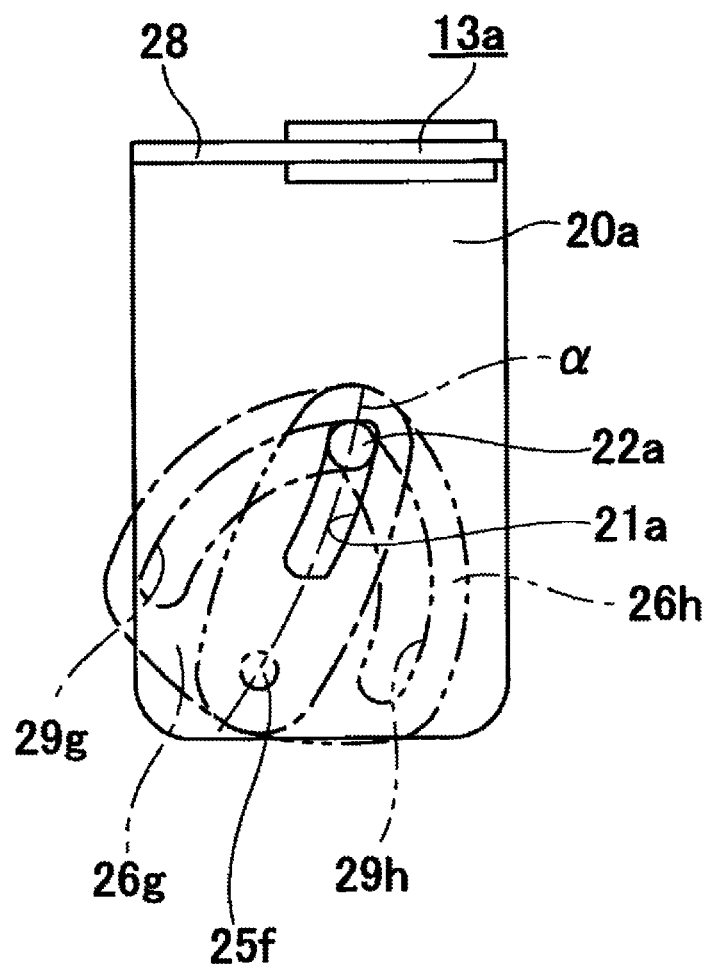
FIG. 12A is a side view illustrating a position of the rotating friction plate according to the fifth embodiment at a state where the steering wheel is moved to the upper end position of the adjustable range.
Figure 12B:
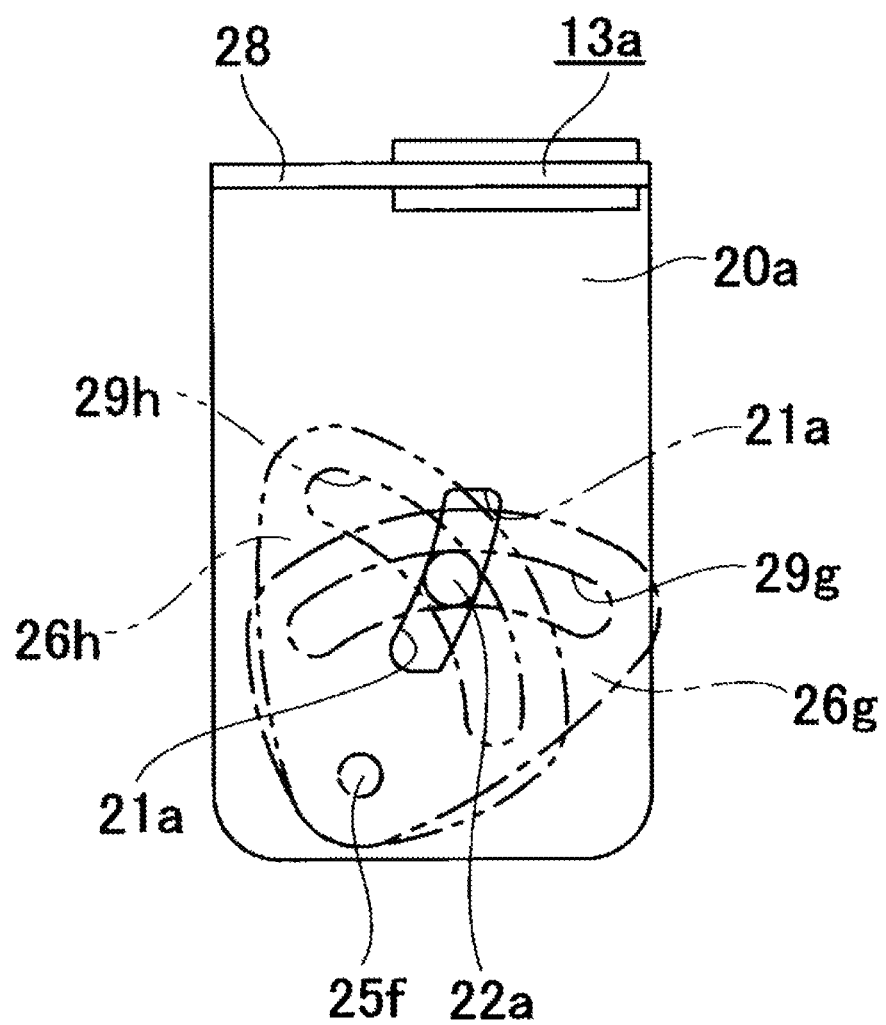
FIG. 12B is a side view illustrating a position of the rotating friction plate at a state where the steering wheel is moved to the intermediate position.
Figure 12C:
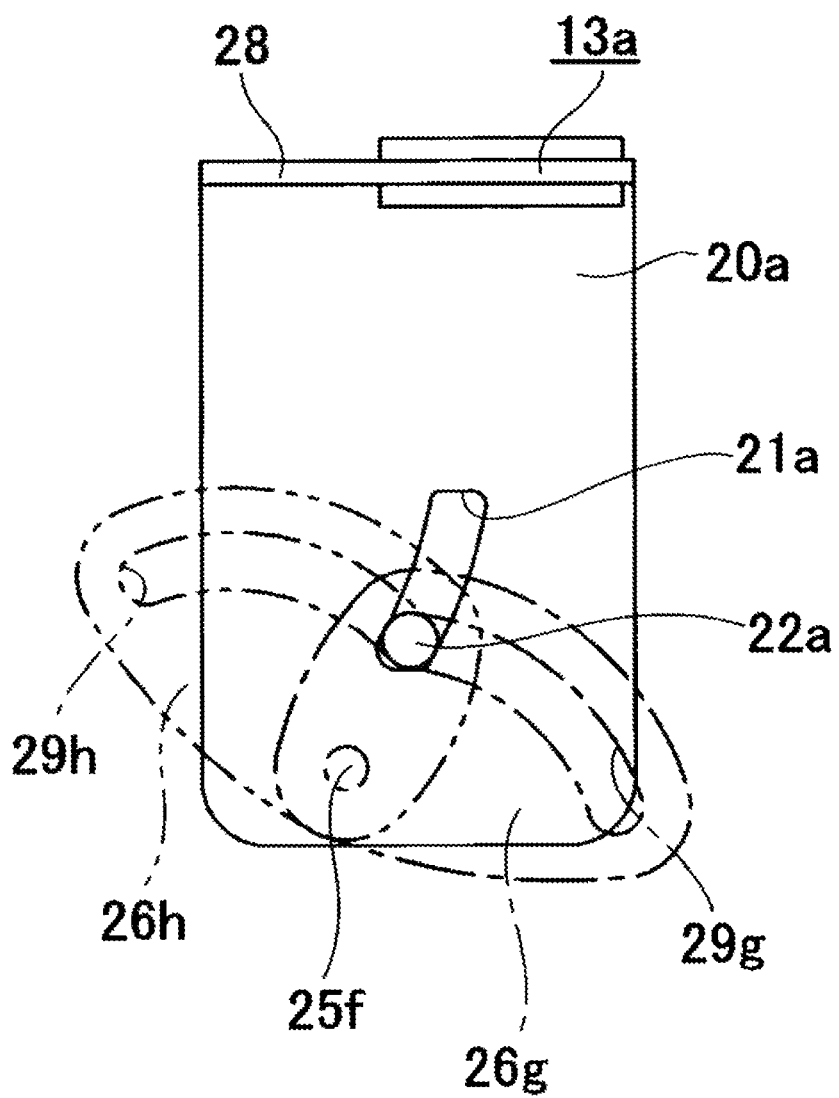
FIG. 12C is a side view illustrating a position of the rotating friction plate at a state where the steering wheel is moved to the lower end position.
Figure 13:
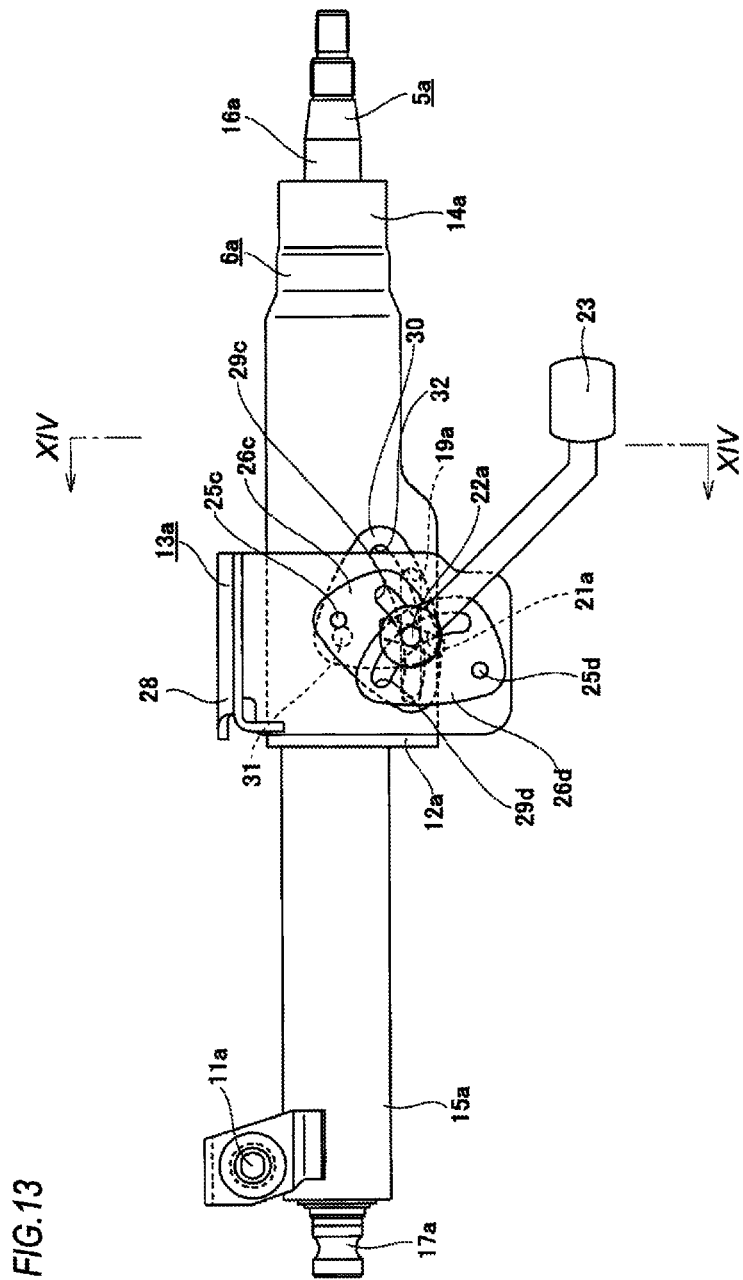
FIG. 13 is a side view illustrating a sixth embodiment of the present invention.
Figure 14:
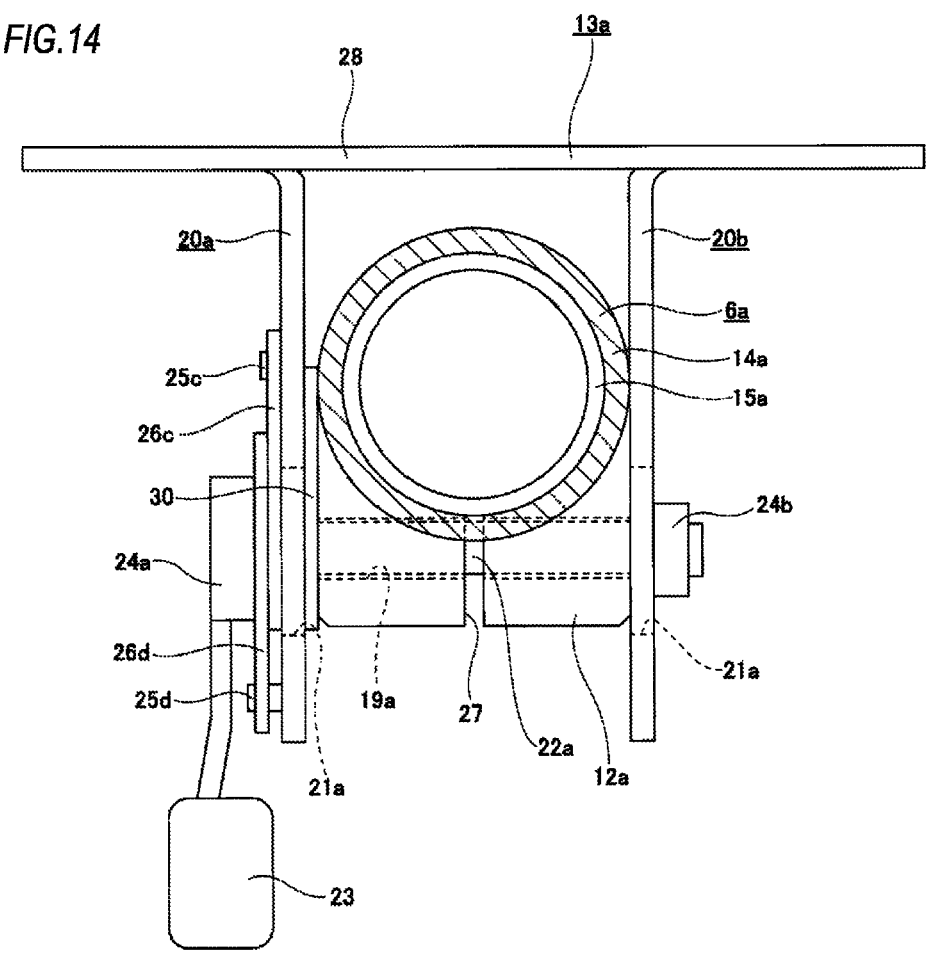
FIG. 14 is a sectional view taken along a line XIV-XIV of FIG. 13.

FIGS. 11 to 12C illustrate a fifth embodiment of the present invention. The steering wheel position adjustment device of the fifth embodiment has a rotation support shaft 25f and a pair of rotating friction plate 26g, 26h. The rotation support shaft 25f is provided at a portion on the outer surface of the support plate part 20b of the support bracket 13a, which is positioned on the extension line of the center line α (refer to FIG. 12A) of the upper-lower long hole 21a formed in the support plate part 20b and below the upper-lower long hole 21a. The rotating friction plates 26e, 26f are interposed with being overlapped with each other between the outer surface of the support plate part 20b and the inner surface of the pressing part 24b. The adjustment rod 22a is inserted into long guide hole 29g, 29h formed in respective tip half portions of the rotating friction plates 26g, 26h. Base end portions of the rotating friction plates 26g, 26h are supported to the rotation support shaft 25f to be rotatably displaced about the rotation support shaft 25f such that when adjusting the upper-lower position of the steering wheel 1 (refer to FIG. 19) in one direction, the rotating friction plates 26g, 26h are rotated in opposite directions. Since the other configurations and operations are the same as the fourth embodiment, the overlapping descriptions are omitted.

FIGS. 13 to 16 illustrate a sixth embodiment of the present invention. According to the sixth embodiment, like the third embodiment, the pair of rotating friction plate 26c, 26d is interposed with being overlapped with each other between the outer surface of the support plate part 20a of the support bracket 13a and the inner surface of the pressing part 24a. The base end portions of the rotating friction plates 26c, 26d are supported to the rotation support shafts 25c, 25d to be rotatably displaced about the rotation support shafts 25c, 25d. That is, when the steering wheel 1 (refer to FIG. 19) is displaced downwards from the upper end position to the lower end position, the rotating friction plates 26c, 26d are rotated as sequentially shown in FIG. 7A, FIG. 7B and FIG. 7C, and when the steering wheel 1 (refer to FIG. 19) is displaced upwards from the lower end position to the upper end position, the rotating friction plates 26c, 26d are rotated as sequentially shown in FIG. 7C, FIG. 7B and FIG. 7A.

Further, according to the sixth embodiment, a telescopic rotating friction plate 30, which is configured to be rotatably displaced as the front-rear position of the steering wheel 1 is adjusted, is interposed between the inner surface of the support plate part 20a and one surface of the displacement bracket 12a. A telescopic rotation support shaft 31 is provided in parallel with the adjustment rod 22a on one surface (left side surface of FIG. 14) of the displacement bracket 12a which is displaced relative to the adjustment rod 22a when adjusting the front-rear position of the steering wheel 1. The telescopic rotation support shaft 31 is mounted at a portion of one surface of the displacement bracket 12a, which is positioned on a virtual line $\beta$ (refer to FIG. 15B), which passes a front and rear center position of the front-rear long hole 19a formed in the displacement bracket 12a and is perpendicular to the axial direction of the steering column 6a (the longitudinal direction of the front-rear long hole 19a), and above the front-rear long hole 19a. However, the telescopic rotation support shaft 31 may also be mounted below the front-rear long hole 19a as long as it is positioned on the virtual line $\beta$. By this structure, a distance LF between the center axis of the telescopic rotation support shaft 31 and the center axis of the adjustment rod 22a with the steering wheel 1 being located at the front end position and a distance LB between the center axis of the telescopic rotation support shaft 31 and the center axis of the adjustment rod 22a with the steering wheel 1 being located at the rear end position are made to be the same (LF=LB).

The telescopic rotating friction plate 30 is a flat plate member having a substantially circular sector shape formed by a metal plate such as a steel plate and a stainless steel plate capable of securing necessary strength and stiffness and increasing frictional coefficients of the engaging portions with the inner surface of the support plate part 20a and the one surface of the displacement bracket 12a, which are the opposing surfaces of the telescopic rotating friction plate 30. The telescopic rotating friction plate 30 is rotatably supported about the telescopic rotation support shaft 31 at an upper end side portion, which is the base end portion thereof. The telescopic rotating friction plate 30 is interposed between the inner surface of the support plate part 20a and the one surface of the displacement bracket 12a. The adjustment rod 22a is inserted into a telescopic long guide hole 32 formed in a lower half portion of the support plate part 20a. The telescopic long guide hole 32 is formed to be a smooth curve such that a distance from the telescopic rotation support shaft 31 becomes greater from a front end portion to a rear end portion. Specifically, the telescopic long guide hole 32 has a partial arc shape having, as a center, a point positioned in front of the virtual line $\beta$ and above the telescopic rotation support shaft 31 at a state (refer to a state shown in FIG. 15B) where the adjustment rod 22a is positioned at a center in the front-rear long hole 19a. An angle $\psi$ between a tangential line of a portion of the partial arc, to which the adjustment rod 22a is engaged, and a tangential line (a rotating direction of the telescopic rotating friction plate 30) of a virtual arc, which has a center axis of the telescopic rotation support shaft 31 as a center and has a distance L between the adjustment rod 22a and the telescopic rotation support shaft 31 as a radius, is made to be substantially constant irrespective of the front-rear position of the adjustment rod 22a. The angle $\psi$ is preferably 10° to 35°. When the front-rear position of the steering wheel 1 is located at a center of the adjustable range, the adjustment rod 22a and a front end portion of the telescopic long guide hole 32 are engaged, and when the steering wheel 1 is located at the rear or front end position, the adjustment rod 22a and a rear end portion of the telescopic long guide hole 32 are engaged. That is, according to the sixth embodiment, while the adjustment rod 22a is displaced along the telescopic long guide hole 32 as the front-rear position of the steering wheel 1 is adjusted, the directions (expanding direction and contracting direction) in which the distance between the adjustment rod 22a and the telescopic rotation support shaft 31 is changed become opposite to each other with respect to the center position of the position adjustable range of the steering wheel 1 in the front-rear direction.

Figure 15A:
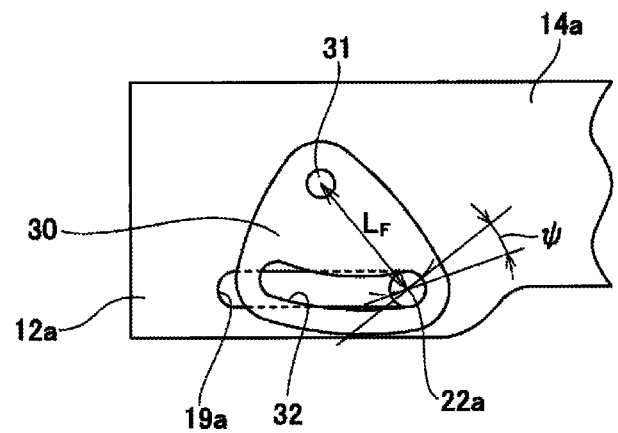
FIG. 15A is a side view illustrating a position of a telescopic rotating friction plate at a state where the steering wheel is moved to a front end position of the adjustable range.
Figure 15B:
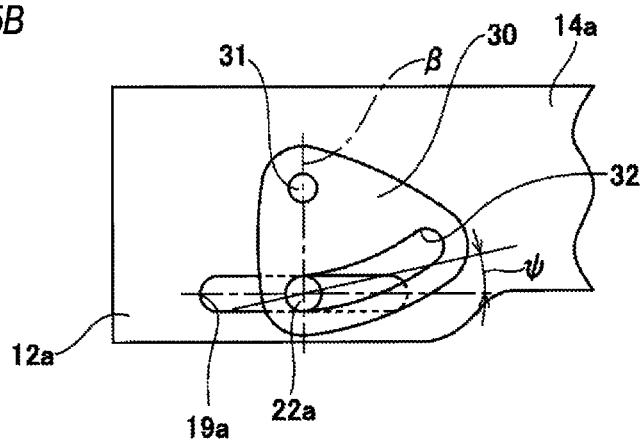
FIG. 15B is a side view illustrating a position of the rotating friction plate at a state where the steering wheel is moved to the intermediate position.
Figure 15C:
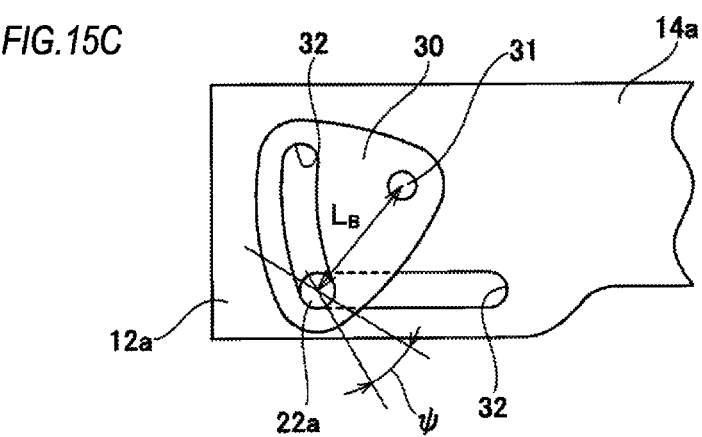
FIG. 15C is a side view illustrating a position of the rotating friction plate at a state where the steering wheel is moved to a rear end position.

Subsequently, the movement of the telescopic rotating friction plate 30 of the sixth embodiment, which is made when the steering wheel 1 is displaced in the front-rear direction so as to adjust the front-rear position of the steering wheel 1, is described. FIG. 15A illustrates a state where the steering wheel 1 is moved to the adjustable front end position. At this state, the adjustment rod 22a, the rear end portion of the front-rear long hole 19a and the rear end portion of the telescopic long guide hole 32 are engaged. Therefore, when the steering wheel 1 is displaced rearwards from this state to displace forward the adjustment rod 22a in the front-rear long hole 19a, the distance between the center axes of the adjustment rod 22a and the telescopic rotation support shaft 31 is shortened, so that the telescopic rotating friction plate 30 is rotated about the telescopic rotation support shaft 31 in the counterclockwise direction of FIG. 15A and FIG. 15B, as sequentially shown in FIG. 15A and FIG. 15B. At a neutral position state shown in FIG. 15B, the adjustment rod 22 is engaged with the center of the front-rear long hole 19a in the front-rear direction and the front end portion of the telescopic long guide hole 32. For this reason, when the steering wheel 1 is further displaced rearwards from the state of FIG. 15B and is moved to the rear end position, the distance between the center axes of the adjustment rod 22a and the telescopic rotation support shaft 31 is increased, so that the telescopic rotating friction plate 30 is rotated about the telescopic rotation support shaft 31 in the clockwise direction of FIG. 15B and FIG. 15C, as sequentially shown in FIG. 15B and FIG. 15C. In contrast, when the steering wheel 1 is displaced forwards from the rear end position to the front end position, the telescopic rotating friction plate 30 is rotated reversely with the above forward displacement, as sequentially shown in FIG. 15C, FIG. 15B and FIG. 15A.

According to the steering wheel position adjustment device of the sixth embodiment as described above, it is possible to increase the force of holding the steering wheel 1 at the adjusted position in the front-rear direction, in addition to the force of holding the upper-lower position of the steering wheel.

Figure 16:
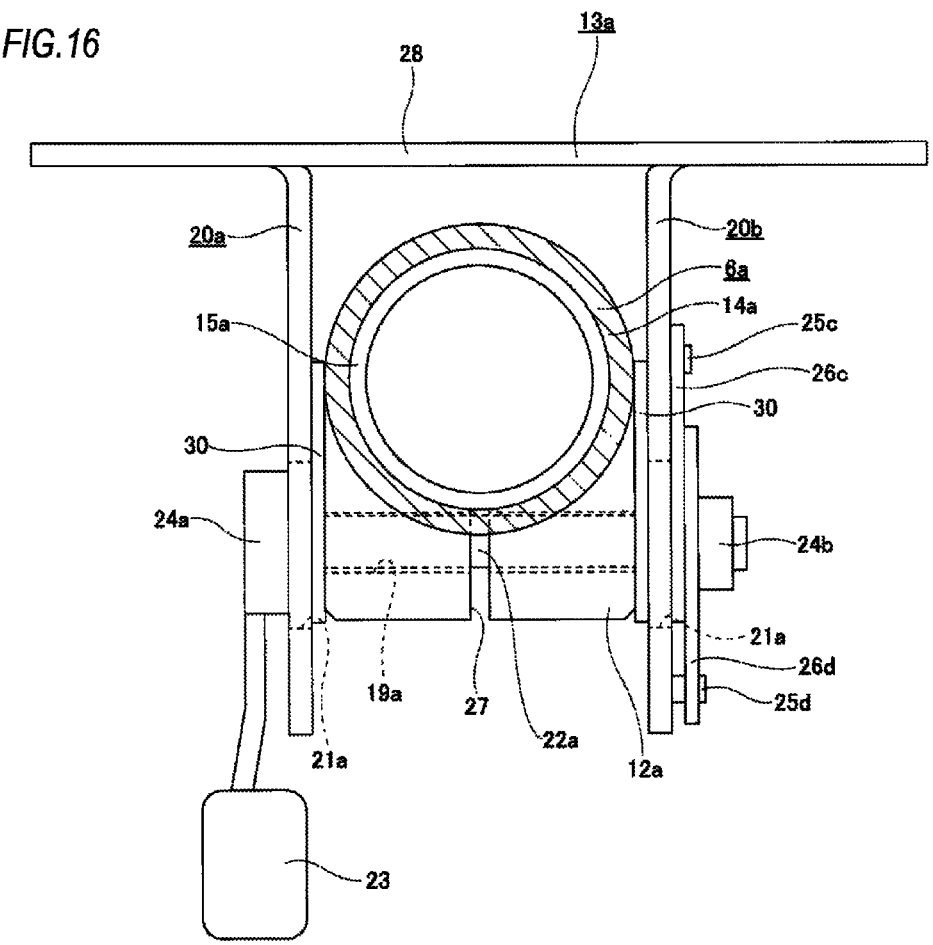
FIG. 16 is a view similar to FIG. 14, illustrating another example of the mounting positions of the rotating friction plate and the telescopic rotating friction plate.

According to the sixth embodiment, the telescopic rotating friction plate 30 is interposed between the inner surface of the support plate part 20a and the one surface of the displacement bracket 12a. However, the telescopic rotating friction plate 30 may be interposed between the inner surface of the other support plate part 20b and the other side surface of the displacement bracket 12a or may be interposed between the inner surfaces of the support plate parts 20a, 20b and both side surfaces of the displacement bracket 12a one by one, respectively. In any case, the telescopic rotation support shaft configured to rotatably support the base end portion of the telescopic rotating friction plate is provided on the side surface of the displacement bracket which is displaced relative to the adjustment rod when adjusting the upper-lower position of the steering wheel. The rotating friction plates 26c, 26d may be interposed at one to four portions between the side surfaces of the support plate parts 20a, 20b and the opposing surfaces facing the side surfaces by one set, respectively. Therefore, as shown in FIG. 16, for example, the pair of rotating friction plates 26c, 26d may be interposed between the outer surface of the support plate part 20b and the inner surface of the pressing part 24b, and the telescopic rotating friction plate 30 may be interposed between the inner surfaces of the pair of support plate parts 20a, 20b and both side surfaces of the displacement bracket 12a one by one, respectively. Since the other configurations and operations are the same as the fourth embodiment, the overlapping descriptions are omitted.

Figure 17A:
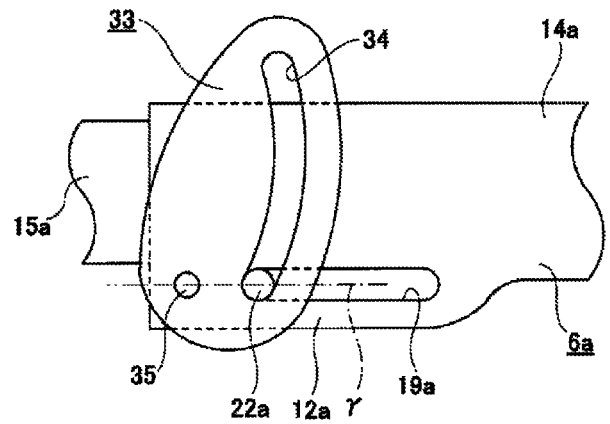
FIG. 17A is a side view illustrating a position of the rotating friction plate according to a seventh embodiment of the present invention at a state where the steering wheel is moved to the front end position of the adjustable range.
Figure 17B:
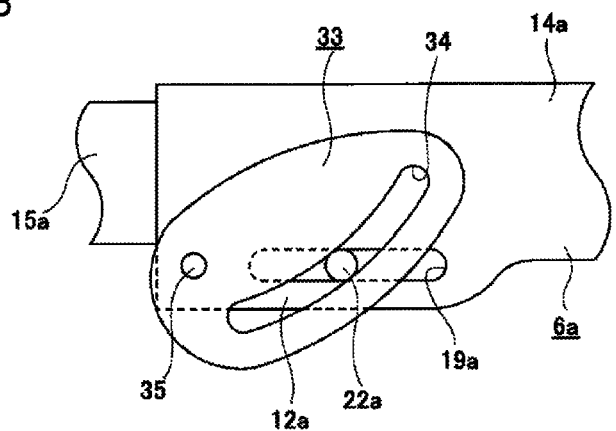
FIG. 17B is a side view illustrating a position of the rotating friction plate at a state where the steering wheel is moved to the intermediate position.
Figure 17C:
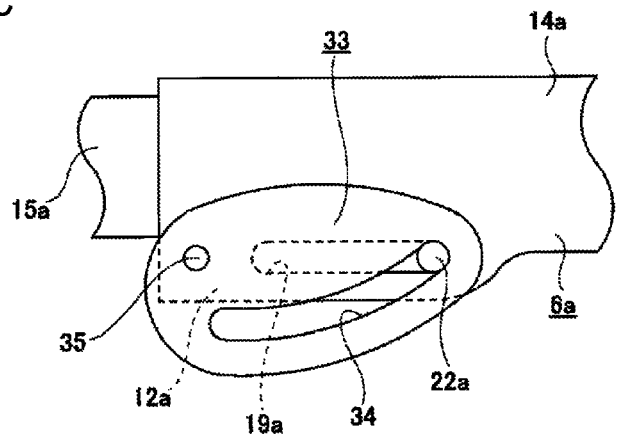
FIG. 17C is a side view illustrating a position of the rotating friction plate at a state where the steering wheel is moved to the rear end position.
Figure 18:
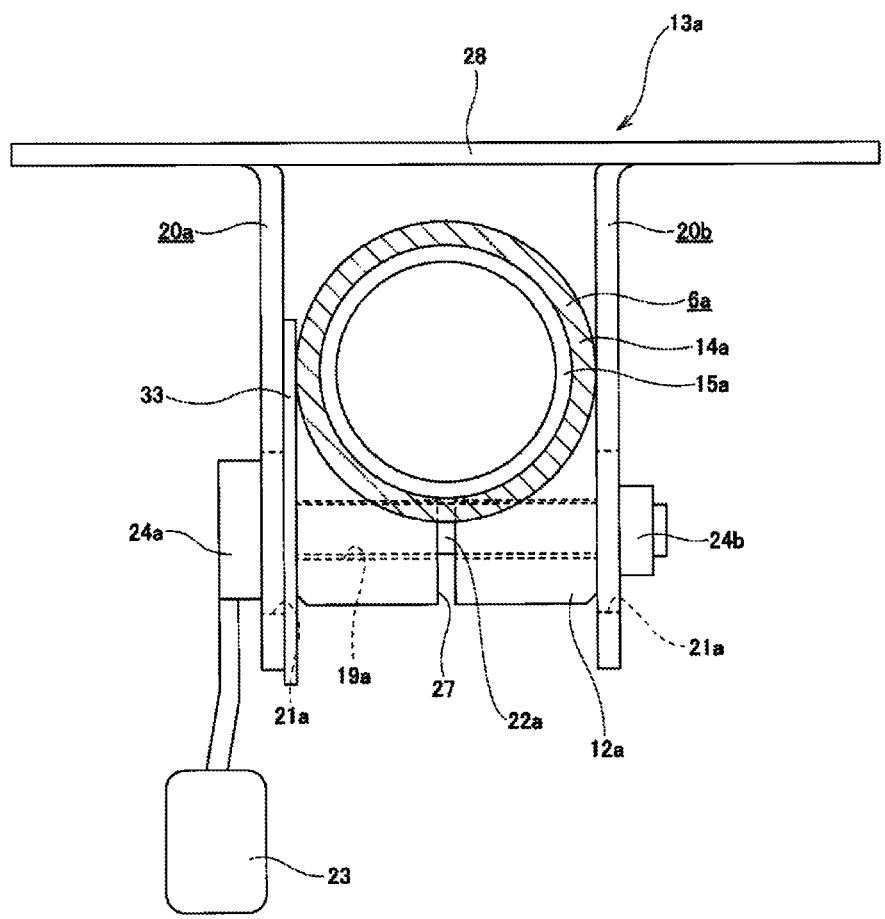
FIG. 18 is a view similar to FIG. 2, illustrating the seventh embodiment.

FIGS. 17A to 18 illustrate a seventh embodiment of the present invention. The steering wheel position adjustment device of the seventh embodiment has a rotating friction plate 33 which is configured to be rotatably displaced in the upper-lower direction as the front-rear position of the steering wheel 1 (refer to FIG. 19) is adjusted. The rotating friction plate 33 is interposed between the inner surface of the support plate part 20a of the support bracket 13a and the outer surface of the displacement bracket 12a. The adjustment rod 22a is inserted into a long guide hole 34 formed in a tip half portion of the rotating friction plate 33. A rotation support shaft 35 is provided on a portion of the outer surface of the displacement bracket 12a configured to be displaced relative to the adjustment rod 22a when adjusting the front-rear position of the steering wheel 1, which portion is positioned on the extension line (including the vicinity thereof) of a center line γ (refer to FIG. 17A) of the front-rear long hole 19a formed in the displacement bracket 12a and in front of the front-rear long hole 19a. A base end portion of the rotating friction plate 33 is supported to rotatably displaceable about the rotation support shaft 35.

The long guide hole 34 is formed to be a smooth curve such that a distance from the rotation support shaft 35 becomes greater from a lower end (a front end in the clockwise direction of FIGS. 17A to 17C), which is one end in the rotating direction, to an upper end (a rear end in the clockwise direction of FIGS. 17A to 17C), which is the other end in the rotating direction. Specifically, the long guide hole 34 has a partial arc shape having, as a center, a point positioned above the center line γ and in front of the rotation support shaft 35 at a state (refer to a state shown in FIG. 17B) where the adjustment rod 22a is positioned at a center part in the front-rear long hole 19a. A base end portion (a portion corresponding to a rotation shaft of a circular sector) of the rotating friction plate 33 is supported to the rotation support shaft 35 to be rotatably displaced about the rotation support shaft 35 such that when the adjustment rod 22a is positioned at a front end portion of the moveable range in the front-rear long hole 19a, the adjustment rod 22a and an upper end portion of the long guide hole 34 are engaged, and when the adjustment rod 22a is positioned at a rear end portion of the moveable range, the adjustment rod 22a and a lower end portion of the long guide hole 34 are engaged.

Subsequently, the movement of the seventh embodiment, which is made when the steering wheel 1 (the outer column 14a) is displaced in the front-rear direction so as to adjust the front-rear position of the steering wheel 1, is described. FIG. 17A illustrates a state where the steering wheel 1 is moved to the adjustable rear end position. At this state, the adjustment rod 22a, the front end portion of the front-rear long hole 19a and the lower end portion of the long guide hole 34 are engaged. When the steering wheel 1 is displaced forwards from this state to displace rearward the adjustment rod 22a, a distance between the center axes of the adjustment rod 22a and the rotation support shaft 35 is increased, so that the rotating friction plate 33 is rotated about the rotation support shaft 35 in the clockwise direction of FIGS. 17A to 17C, as sequentially shown in FIG. 17A, FIG. 17B and FIG. 17C. At a state where the steering wheel 1 is moved to the adjustable front end position, the adjustment rod 22a is engaged with the rear end portion of the front-rear long hole 19a and the upper end portion of the long guide hole 34, as shown in FIG. 17C. When the steering wheel 1 is displaced rearwards from the front end position to the rear end position, the rotating friction plate 33 is rotated reversely with the above forward displacement, as sequentially shown in FIG. 17C, FIG. 17B and FIG. 17A.

According to the seventh embodiment, it is possible to increase the force of holding the front-rear position of the steering wheel 1 at the adjusted position, and to stably separate forward the outer column 14a together with the support bracket 13a based on the forward shock load applied to the steering wheel 1 upon the secondary collision, for example. In the seventh embodiment, the rotating friction plate 33 is interposed between the inner surface of the one (left in FIG. 18) support plate part 20a and the outer surface of the displacement bracket 12a. However, the rotating friction plate 33 may be interposed between the inner surface of the other (right in FIG. 18) support plate parts 20b and the outer surface of the displacement bracket 12a or may be interposed therebetween, respectively. The seventh embodiment can be implemented with being combined with the first embodiment or the fifth embodiment. The other configurations and operations are the same as the first embodiment.

The present application is based on Japanese Patent Application No. 2014-000955 filed on Jan. 7, 2014 and Japanese Patent Application No. 2014-168952 filed on Aug. 22, 2014, the contents of which are here incorporated for reference.

DESCRIPTION OF REFERENCE NUMERALS

1: steering wheel
2: steering gear unit
3: input shaft
4: tie-rod
5, 5a: steering shaft
6, 6a: steering column
7: universal joint 8: intermediate shaft
9: universal joint
10: vehicle body
11: pivot shaft
12, 12a: displacement bracket
13, 13a: support bracket
14, 14a: outer column
15, 15a: inner column
16, 16a: outer shaft
17, 17a: inner shaft
18: electric motor
19, 19a: front-rear long hole
20, 20a, 20b: support plate part
21, 21a: upper-lower long hole
22, 22a: adjustment rod
23: adjustment lever
24a, 24b: pressing part
25, 25a to 25f: rotation support shaft
26, 26a to 26h: rotating friction plate
27: slit
28: attachment plate part
29, 29a to 29h: long guide hole
30: telescopic rotating friction plate
31: telescopic rotation support shaft
32: telescopic long guide hole
33: rotating friction plate
34: long guide hole
35: rotation support shaft

The invention claimed is:

1. A steering wheel position adjustment device comprising:
 a cylindrical steering column having an inner side to which a steering shaft having a rear end portion configured to support a steering wheel is rotatably supported;
 a displacement bracket fixed to a portion of the steering column and formed with a column-side through hole penetrating the displacement bracket in a width direction;
 a support bracket having a pair of support plate parts and supported to a vehicle body, the pair of support plate parts interposing therebetween the displacement bracket from both sides in the width direction and formed with vehicle body-side through holes at portions where the support plate parts conform to each other;
 an adjustment rod inserted in the column-side through hole and the vehicle body-side through holes in the width direction;
 a pair of pressing parts provided at both end portions of the adjustment rod protruding from outer surfaces of the pair of support plate parts;
 an adjustment lever provided at one end portion of the adjustment rod and configured to rotate about the adjustment rod to expand and contract an interval between the pair of pressing parts; and
 a friction plate interposed in at least one of a portion between an inner surface of the pair of support plate parts and a side surface of the displacement bracket and a portion between an outer surface of the pair of support plate parts and an inner surface of the pair of pressing parts,
 wherein at least one of the column-side through hole and the vehicle body-side through holes is configured as an adjustment long hole which is long in a direction in which a position of the steering wheel is adjustable,
 wherein the friction plate includes at least one rotating friction plate having a base end portion rotatably supported to a rotation support shaft and a tip half portion formed with a long guide hole with which the adjustment rod is engaged,
 wherein the rotation support shaft is provided at a portion which is displaced relative to the adjustment rod when the adjustment rod is displaced along the adjustment long hole and which is positioned on an extension line of a center line of the adjustment long hole,
 wherein the adjustment rod is engaged with the long guide hole to be displaceable only along the long guide hole,
 wherein at least a portion of the at least one rotating friction plate is interposed in at least one of the portion between the inner surface of the pair of support plate parts and the side surface of the displacement bracket and the portion between the outer surface of the pair of support plate parts and the inner surface of the pair of pressing parts,
 wherein the at least one rotating friction plate includes a pair of rotating friction plates, and
 wherein the rotation support shaft configured to rotatably support a base end portion of one of the rotating friction plates is provided at one side of the adjustment long hole on the extension line of the center line of the adjustment long hole along the longitudinal direction, and a second rotation support shaft configured to rotatably support a base end portion of the other of the rotating friction plates is provided at the other side of the adjustment long hole on the extension line of the center line of the adjustment long hole along the longitudinal direction.

2. The steering wheel position adjustment device according to claim 1,
 wherein the long guide hole is formed such that a distance from the rotation support shaft becomes greater as proceeding from one end of the long guide hole towards the other end of the long guide hole in a rotating direction about the rotation support shaft.

3. The steering wheel position adjustment device according to claim 1,
 wherein the at least one rotating friction plate is configured by a steel plate, a stainless steel plate or an aluminum-based alloy plate.

4. The steering wheel position adjustment device according to claim 1,
 wherein a side surface of the at least one rotating friction plate is surface-treated so as to increase a frictional coefficient with a surface facing the side surface.

5. The steering wheel position adjustment device according to claim 1,
 wherein a front end portion of the steering column is supported to the vehicle body so as to be pivotably displaceable about a pivot shaft extending parallel with the adjustment rod,
 wherein each of the vehicle body-side through holes is configured as an upper-lower long hole which is long in an upper-lower direction, and
 wherein the rotation support shaft is provided on a side surface of one of the support plate parts.

6. The steering wheel position adjustment device according to claim 1,
 wherein the steering column is configured by fitting a front end portion of an outer column to a rear end portion of an inner column to be relatively displaceable in an axial direction, wherein the displacement bracket is fixed to the outer column, wherein the column-side through hole is configured as a front-rear long hole which is long in the axial direction of the outer column, and wherein the rotation support shaft is provided on an outer surface of the outer column.

7. A steering wheel position adjustment device comprising:

a cylindrical steering column having an inner side to which a steering shaft having a rear end portion configured to support a steering wheel is rotatably supported;

a displacement bracket fixed to a portion of the steering column and formed with a column-side through hole penetrating the displacement bracket in a width direction;

a support bracket having a pair of support plate parts and supported to a vehicle body, the pair of support plate parts interposing therebetween the displacement bracket from both sides in the width direction and formed with vehicle body-side through holes at portions where the support plate parts conform to each other;

an adjustment rod inserted in the column-side through hole and the vehicle body-side through holes in the width direction;

a pair of pressing parts provided at both end portions of the adjustment rod protruding from outer surfaces of the pair of support plate parts;

an adjustment lever provided at one end portion of the adjustment rod and configured to rotate about the adjustment rod to expand and contract an interval between the pair of pressing parts; and a friction plate interposed in at least one of a portion between an inner surface of the pair of support plate parts and a side surface of the displacement bracket and a portion between an outer surface of the pair of support plate parts and an inner surface of the pair of pressing parts, wherein at least one of the column-side through hole and the vehicle body-side through holes is configured as an adjustment long hole which is long in a direction in which a position of the steering wheel is adjustable, wherein the friction plate includes at least one rotating friction plate having a base end portion rotatably supported to a rotation support shaft and a tip half portion formed with a long guide hole with which the adjustment rod is engaged, wherein the rotation support shaft is provided at a portion which is displaced relative to the adjustment rod when the adjustment rod is displaced along the adjustment long hole and which is positioned on an extension line of a center line of the adjustment long hole, wherein the adjustment rod is engaged with the long guide hole to be displaceable only along the long guide hole, wherein the at least one rotating friction plate includes a pair of rotating friction plates, wherein the rotation support shaft includes a pair of rotation support shafts which are configured to rotatably support the base end portions of the rotating friction plates and are concentric, and wherein the rotating friction plates are rotated in opposite directions when adjusting a position of the steering wheel in one direction.

8. The steering wheel position adjustment device according to claim 7, wherein the long guide hole is formed such that a distance from the rotation support shaft becomes greater as proceeding from one end of the long guide hole towards the other end of the long guide hole in a rotating direction about the rotation support shaft.

9. The steering wheel position adjustment device according to claim 7, wherein the at least one rotating friction plate is configured by a steel plate, a stainless steel plate or an aluminum-based alloy plate.

10. The steering wheel position adjustment device according to claim 7, wherein a side surface of the at least one rotating friction plate is surface-treated so as to increase a frictional coefficient with a surface facing the side surface.

11. The steering wheel position adjustment device according to claim 7, wherein a front end portion of the steering column is supported to the vehicle body so as to be pivotably displaceable about a pivot shaft extending parallel with the adjustment rod, wherein each of the vehicle body-side through holes is configured as an upper-lower long hole which is long in an upper-lower direction, and wherein the rotation support shaft is provided on a side surface of one of the support plate parts.

12. The steering wheel position adjustment device according to claim 7, wherein the steering column is configured by fitting a front end portion of an outer column to a rear end portion of an inner column to be relatively displaceable in an axial direction, wherein the displacement bracket is fixed to the outer column, wherein the column-side through hole is configured as a front-rear long hole which is long in the axial direction of the outer column, and wherein the rotation support shaft is provided on an outer surface of the outer column.

* * * * *